US012675284B2

(12) United States Patent
Wang et al.

(10) Patent No.: US 12,675,284 B2
(45) Date of Patent: Jul. 7, 2026

(54) LIVE UPGRADE OPTIMIZATIONS TO REDUCE DOWNTIME

(71) Applicant: Oracle International Corporation, Redwood Shores, CA (US)

(72) Inventors: Qiang Wang, Bellevue, WA (US); Kent Lee, Ladera Ranch, CA (US); Nan Wu, Snoqualmie, WA (US)

(73) Assignee: Oracle International Corporation, Redwood Shores, CA (US)

( * ) Notice: Subject to any disclaimer, the term of this patent is extended or adjusted under 35 U.S.C. 154(b) by 154 days.

(21) Appl. No.: 18/198,638

(22) Filed: May 17, 2023

(65) Prior Publication Data

US 2023/0376301 A1 Nov. 23, 2023

Related U.S. Application Data

(63) Continuation-in-part of application No. 17/747,277, filed on May 18, 2022, now Pat. No. 12,547,438.

(51) Int. Cl.
*G06F 9/44* (2018.01)
*G06F 8/656* (2018.01)

(52) U.S. Cl.
CPC .................................... *G06F 8/656* (2018.02)

(58) Field of Classification Search
CPC ....................................................... G06F 8/656
USPC ........................................................ 717/172
See application file for complete search history.

(56) References Cited

U.S. PATENT DOCUMENTS

| | | | | |
|---|---|---|---|---|
| 5,889,965 A | * | 3/1999 | Wallach | .............. G06F 13/4027 710/72 |
| 6,324,608 B1 | * | 11/2001 | Papa | ........................ H04L 41/12 710/104 |
| 7,818,606 B1 | | 10/2010 | Stack et al. | |
| 8,606,910 B2 | * | 12/2013 | Alperovitch | ............ H04L 45/02 709/224 |
| 10,652,115 B1 | | 5/2020 | Chen et al. | |

(Continued)

OTHER PUBLICATIONS

"Build Ultra High-Performance Storage Applications with the Storage Performance Development Kit", SPDK, Available Online at: https://spdk.io/, Accessed from Internet on Oct. 3, 2022, 5 pages.

(Continued)

*Primary Examiner* — Evral E Bodden
(74) *Attorney, Agent, or Firm* — Kilpatrick Townsend & Stockton LLP

(57) ABSTRACT

Techniques disclosed herein include receiving a request to perform an upgrade. The upgrade can comprise changes to firmware or software of the network interface card. Input/ Output (I/O) traffic can be monitored on one or more paths between the network interface card and a storage device. The paths can have a path capacity comprising a bandwidth of Input/Output traffic. The spare Input/Output traffic capacity can be calculated based at least in part on the Input/ Output traffic and the path capacity. Whether to remove a path can be determined based at least in part on the spare Input/Output traffic capacity. The upgrade can be performed with the path halted in accordance with a determination to remove the path. The upgrade can be performed with the path included in accordance with a determination to not remove the path.

20 Claims, 17 Drawing Sheets

(56) References Cited

U.S. PATENT DOCUMENTS

| | | | | |
|---|---|---|---|---|
| 11,757,757 | B2 * | 9/2023 | Alaettinoglu | H04L 45/42 |
| | | | | 709/238 |
| 2003/0182411 | A1 * | 9/2003 | Wang | H04L 9/40 |
| | | | | 714/E11.135 |
| 2006/0095468 | A1 * | 5/2006 | Allen | G06F 3/067 |
| 2010/0122111 | A1 * | 5/2010 | Allen | G06F 11/2005 |
| | | | | 710/33 |
| 2010/0131669 | A1 | 5/2010 | Srinivas et al. | |
| 2014/0126356 | A1 | 5/2014 | Lee et al. | |
| 2016/0313985 | A1 * | 10/2016 | Sprygada | G06F 8/654 |
| 2019/0073141 | A1 | 3/2019 | Brennan et al. | |
| 2019/0073162 | A1 | 3/2019 | Karr et al. | |
| 2019/0073265 | A1 | 3/2019 | Brennan et al. | |
| 2019/0190851 | A1 | 6/2019 | Hsu et al. | |
| 2020/0264954 | A1 | 8/2020 | Belgaied et al. | |

OTHER PUBLICATIONS

"NVM Express—Scalable, Efficient, and Industry Standard", Available Online at: https://nvmexpress.org/, Accessed from Internet on Oct. 3, 2022, 5 pages.

U.S. Appl. No. 18/649,290, "Non-Final Office Action", mailed Jul. 2, 2025, 13 pages.

U.S. Appl. No. 17/747,277, "Non-Final Office Action", mailed Apr. 2, 2025, 8 pages.

U.S. Appl. No. 17/747,277, Notice of Allowance, mailed on Nov. 4, 2025, 5 pages.

U.S. Appl. No. 17/747,277, "Supplemental Notice of Allowability", mailed on Nov. 25, 2025, 2 pages.

U.S. Appl. No. 17/747,277, "Supplemental Notie of Allowability", mailed on Jan. 7, 2026, 2 pages.

U.S. Appl. No. 18/649,290, Final Office Action, mailed on Dec. 15, 2025, 14 pages.

* cited by examiner

Receiving a request to perform an upgrade
510

Monitor input/output (I/O) traffice on
paths between a network interface card
(NIC) and a storage device 520

Calculate a spare I/O traffic capacity on the
paths 530

Determine whether to halt a path based on
the spare I/O capacity 540

Perform the upgrade 550

700

LIVE UPGRADE OPTIMIZATIONS TO REDUCE DOWNTIME

This application is a continuation-in-part of U.S. application Ser. No. 17/747,277, filed May 18, 2022, entitled "A SINGLE HOP APPROACH FOR DISTRIBUTED BLOCK STORAGE VIA A NETWORK VIRTUALIZATION DEVICE," the entire contents of which is incorporated herein by reference for all purposes.

BACKGROUND

In a "live" upgrade, the software for a server is updated while a customer's processes continue to operate. Ideally, the upgrade should occur without the customer noticing a change in performance. However, using known techniques, input and output (I/O) traffic will be interrupted some during the live upgrade and a customer may notice the interruption. Accordingly, techniques for reducing I/O downtime are desirable.

BRIEF SUMMARY

Techniques disclosed herein include a method for upgrading software. The method can include receiving a request to perform an upgrade. The upgrade can comprise changes to software (e.g., firmware) of the network interface card. Input/Output (I/O) traffic can be monitored on one or more paths between the network interface card and a storage device. The paths can have a path capacity comprising a bandwidth of Input/Output traffic. The spare Input/Output traffic capacity can be calculated based at least in part on the Input/Output traffic and the path capacity. Whether to remove a path (e.g., stop traffic through a path) can be determined based at least in part on the spare Input/Output traffic capacity. The upgrade can be performed with the path halted in accordance with a determination to remove the path. The upgrade can be performed with the path included in accordance with a determination to not remove the path.

The techniques can include embodiments where the storage device is a storage volume. The techniques can include embodiments where the upgrade is delayed until the Input/Output traffic is below a threshold. The techniques can include embodiments where the path is restored after the upgrade is completed. The techniques can include embodiments where determining whether to remove the path is based on a priority for the path. The techniques can include embodiments where the Input/Output traffic is throttled after the path is halted. The techniques can include embodiments where the upgrade is performed within a timeframe.

Techniques disclosed herein include a system configured to perform a software upgrade. The system can be configured to receive a request to perform an upgrade. The upgrade can comprise changes to software (e.g., firmware) of the network interface card. Input/Output (I/O) traffic can be monitored on one or more paths between the network interface card and a storage device. The paths can have a path capacity comprising a bandwidth of Input/Output traffic. The spare Input/Output traffic capacity can be calculated based at least in part on the Input/Output traffic and the path capacity. Whether to remove a path can be determined based at least in part on the spare Input/Output traffic capacity. The upgrade can be performed with the path halted in accordance with a determination to remove the path. The upgrade can be performed with the path included in accordance with a determination to not remove the path.

Techniques disclosed herein also include a non-transitory computer-readable medium storing a set of instructions that, when executed by one or more processors of a device, can cause the device to receive a request to perform an upgrade. The upgrade can comprise changes to software (e.g., firmware) of the network interface card. Input/Output (I/O) traffic can be monitored on one or more paths between the network interface card and a storage device. The paths can have a path capacity comprising a bandwidth of Input/Output traffic. The spare Input/Output traffic capacity can be calculated based at least in part on the Input/Output traffic and the path capacity. Whether to remove a path can be determined based at least in part on the spare Input/Output traffic capacity. The upgrade can be performed with the path halted in accordance with a determination to remove the path. The upgrade can be performed with the path included in accordance with a determination to not remove the path.

BRIEF DESCRIPTION OF THE DRAWINGS

FIG. 17 is a block diagram illustrating an example computer system, according to at

DETAILED DESCRIPTION

Figure 1:
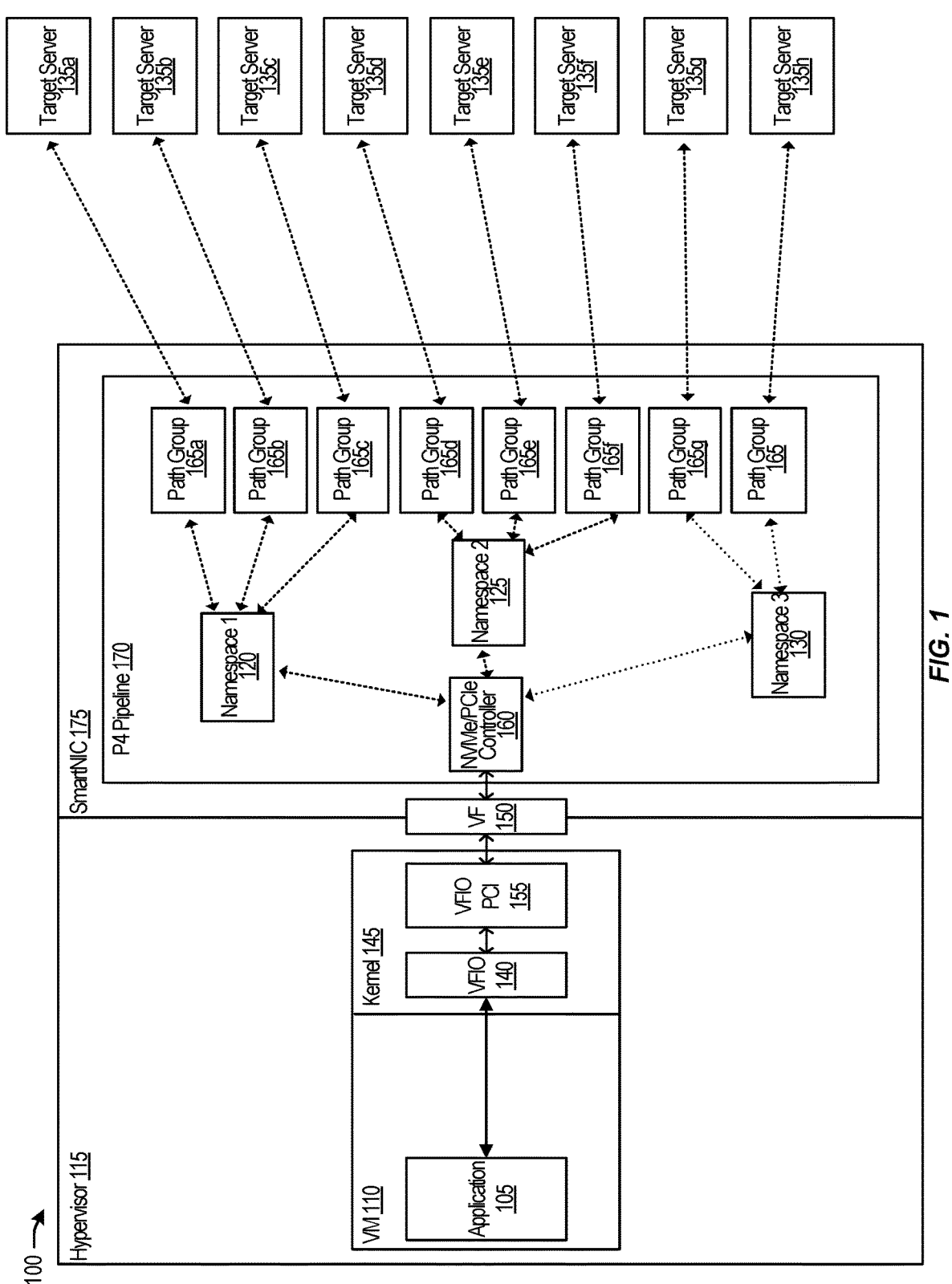
FIG. 1 is a diagram showing multipath handling of a smart network interface card (smartNIC) according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

During a "live upgrade," the software (e.g., firmware) for a computing system (e.g., a virtual machine (VM) or even a bare metal server (BM) (VM/BM)) can be updated while the computing system continues to operate. A successful live upgrade-occurs within a timeframe that is short enough that a customer using the computing system does not notice the update. During the live upgrade, connections (e.g., paths, network paths, or path groups) between the computing system and storage volumes are halted (e.g., traffic through the connection is stopped), the software is upgraded, and the volume connections are restored.

Typically, the volume paths are halted and restored sequentially and without considering the traffic through the network interface card. While examples are provided with respect to virtual machines and/or bare metal servers (e.g., bare metal instance (VM/BM), the embodiments are applicable to any type of computing system provisioned or otherwise operated for a customer and/or user. Additionally, as used herein, a bare metal instance may be an actual bare metal server (e.g., a server dedicated to a particular user or user's processes) or a virtual implementation of a bare metal server (e.g., a cloud computing instance configured to act as a bare metal server).

The downtime for the live upgrade process can be reduced by removing and restoring storage volume paths based on customer behavior (e.g., traffic sent through the network interface card). Instead of removing and restoring volume paths sequentially, the live upgrade downtime can be reduced by managing the paths based on customer behavior (e.g., by removing unused paths). A path manager within a smart network interface card (smartNIC) can remove unused volume paths prior to the live upgrade, and the smart network interface card can begin the live upgrade once a minimum number of paths has been reached. In some circumstances, the upgrade can be delayed if the number of paths cannot be reduced below a threshold number. After the upgrade is performed, paths can be created sequentially with all paths being created for a first volume before any path is created for subsequent volumes. However, in some embodiments, the smart network interface card can create a path for each volume so that volume access can restart more rapidly. After each volume receives a single path and the volumes can begin processing Input/Output traffic, the remaining paths can be created based on customer demand.

The length of an I/O traffic interruption can depend on the number of I/O paths to and from the customer's virtual machine/bare metal instance (VM/BM). To perform a live upgrade, paths are shut down (e.g., traffic along the path group is halted) before an upgrade is applied and restored after the upgrade. Fewer paths can reduce delays caused by the shutdown and restoration. In addition, a virtual machine/bare metal instance (VM/BM) may not be using all of the available paths. Each path has a bandwidth and the amount of traffic flowing to and from the virtual machine/bare metal instance (VM/BM) can depend on the number of paths. If a customer is using less than the available bandwidth, unused paths can be shut down before the live update. Removing paths before the live upgrade can mean that less time is spent shutting down and restoring paths to the virtual machine/bare metal instance (VM/BM). Additionally, removing unused paths can reduce the length of the live upgrade without the customer noticing a change in performance.

The paths can be halted by a path manager inside a smart network interface card (smartNIC). The smart network interface card agent can monitor I/O traffic for each namespace associated with the smart network interface card. The agent can determine how many of the paths to a namespace are required to support the namespace's current I/O traffic, and the smart network interface card agent can remove unnecessary paths. Regardless of the amount of traffic, the smart network interface card agent will leave at least one I/O path per namespace. The agent can monitor the amount of traffic to determine whether an update is appropriate. If there is a large amount of I/O traffic, the agent may delay the update until an optimal time when there is less traffic.

In an illustrative example, a smart network interface card receives a notification that a live upgrade is scheduled for the smart network interface card, and the smart network interface card begins to throttle traffic. As traffic reduces, the path manager for the smart network interface card begins to halt connections between path groups and target servers (e.g., NVMe/TCP target) while customers continue to use the virtual machine associated with the smart network interface card. Once the number of path groups is reduced to one path group per namespace, the smart network interface card terminates the remaining path groups and begins a live upgrade. During the live upgrade, all connections between the path groups and the target servers are halted. At the conclusion of the live upgrade, which lasted 0.5 seconds, the path manager establishes a connection for each namespace and begins to establish the remaining connections. Once a connection is established for a namespace, the smart network interface card can resume processing Input/Output operations for that namespace.

FIG. 1 illustrates a simplified diagram 100 showing multipath handling of a smart network interface card (smartNIC) 190 according to various embodiments. An application 105 can run in a virtual machine (VM) 110 managed by a hypervisor 115. Application 105 can be any software executing on virtual machine 110 that performs Input/Output operations. In some embodiments, the virtual machine 110 can be a bare metal instance. Three namespaces, namespace 1 device 120, namespace 2 device 125, and namespace 3 130, can be associated with Application 105.

A namespace can be used to organize code into logical groups and allows for resources to be isolated. In some embodiments, the names for resources or objects within a namespace may be unique, but the names can repeat across namespace. For instance, a directory in an operating system can be an example of a namespace because each name in the directory can uniquely identify a file or subdirectory. A namespace can be mapped (e.g., configured to send traffic to and from) to a persistent storage device that can be formatted into logical block units (e.g., bock storage device). A namespace can be analogous to a logical unit in the small computer system interface (SCSI), and a block storage volume can correspond to a single namespace.

Traffic that is to be sent between a namespace, such as namespace 1 120, namespace 2 125, namespace 3 130, and the target servers 135*a*-135*h* can be received via the virtual function Input/Output queue (VFIO) 140 in the kernel 145.

A virtual function (VF) 150 can be connected to VFIO 140 via the VFIO peripheral component interconnect (PCI) 155. VF 150 can be a virtual function or a physical function. The virtual function can be an interface that is associated with a physical function on the network adapter. The virtual function can be a virtualized instance of the network adapter (e.g., the physical function).

The NVMe/PCIe controller 160 can route traffic between the virtual function 150 namespaces. For instance, traffic can be routed between VF 150 and one or more of namespace 1 120, namespace 2 125, or namespace 3 130. The namespaces can be associated with one or more path groups (e.g., path groups 165a-165h) located in the Programming Protocol-Independent Packet Processors (P4) pipeline 170 in smart-NIC 175. For instance, namespace 1 120 can route traffic to path groups 165a-165c, namespace 2 125 can route traffic to path group 165d-165f, and namespace 3 130 can route traffic to path group 165g-165h.

Path groups 165a-165h can contain an active path, that is currently being used to process traffic, and one or more passive paths that are backups to the active paths. Active paths, or passive paths, can be associated with a target server 130a-130i. Traffic between a target server 135a-135h and namespace device 1 120, namespace device 2 125, or namespace device 3 130 can be routed via active paths in path groups 165a-165h. Target servers 130a-130i can route traffic to and from extent servers. Each path group can have a known bandwidth and the NVMe/PCIe controller can monitor traffic (e.g., the number of Input/Output operations) along each path group to determine if the namespace has spare bandwidth. The description for components shown in FIG. 1 can correspond to similar components shown in FIGS. 2-4.

Figure 2:
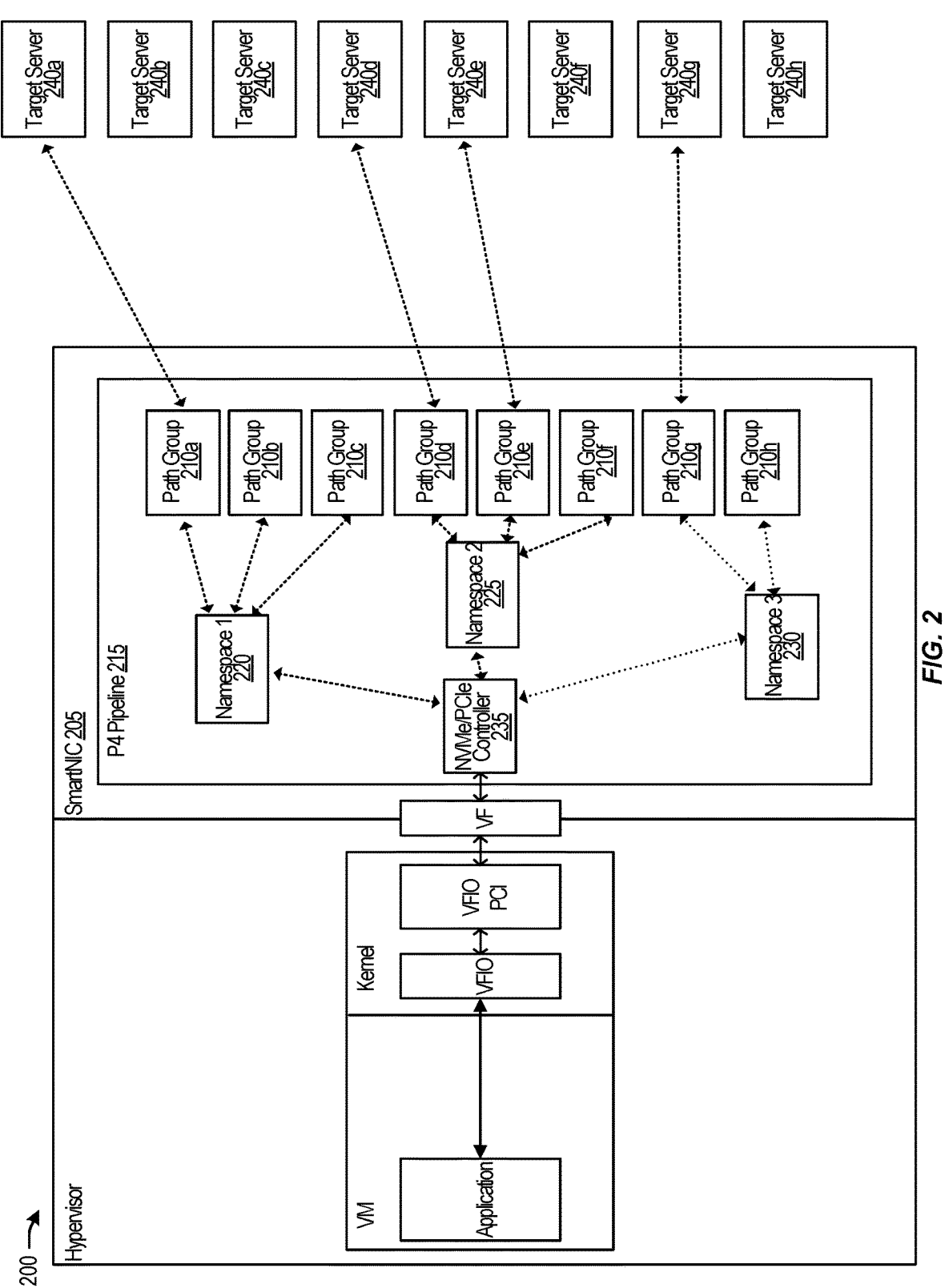
FIG. 2 shows a simplified diagram showing a smart network interface card (smartNIC) that is preparing for a live upgrade according to various embodiments.

FIG. 2 illustrates a simplified diagram 200 showing a smart network interface card (smartNIC) 205 that is preparing for a live upgrade according to various embodiments. The smartNIC can prepare for a live upgrade in response to a request to perform a live upgrade that is received via a control plane of a cloud service provider. The request can be an instruction to perform a live upgrade, an instruction to perform a live upgrade during a time period (e.g., perform a live upgrade within 12 hours), an instruction to perform a live upgrade in response to an event (e.g., the Input/Output traffic through the smartNIC reaching a threshold), an instruction to regularly perform live upgrades (e.g., perform a live upgrade every two weeks), or any combination thereof (e.g., perform a monthly live upgrade when the Input/Output traffic is below a threshold).

A path manager in the smartNIC 205 (e.g., in NVME/PCIe Controller 260) can monitor traffic along one or more of path groups 210a-210h in P4 pipeline 215. In some embodiments, the path manager can be located in any component shown within smartNIC 205. In addition to the traffic along individual path groups, the path manager can monitor the traffic along each namespace such as namespace 1 220, namespace 2 225, or namespace 3 230. The traffic for namespaces may be aggregated by the pathway manager to determine a total traffic for a namespace. Each of path groups 210a-210h can have a bandwidth and NVMe/PCIe controller 235 can allocate traffic to a path group based on the available bandwidth for the path group. For instance, NVMe/PCIe controller 235 can allocate traffic to a first path group for a namespace until the bandwidth for the first path group is above a threshold (e.g., 80% of the bandwidth is utilized). After the traffic for the first path group is above the threshold, the NVMe/PCIe controller 235 can allocate traffic to a second path group.

Path groups can be disconnected from a corresponding target server based on the monitored traffic. A path group that is not currently processing traffic can be shut down by the path manager. Prior to shutting down a path group, the path manager may instruct the NVMe/PCIe controller 235 to consolidate traffic through a namespace from an initial number of path groups to a smaller number of path groups. For instance, the traffic through namespace 1 220 can consume 20% of the available bandwidth through path groups 210a-210c, but this traffic can be evenly spread across each of path groups 210a-210c. The NVMe/PCIe controller 235 can reroute the traffic so that the traffic through namespace 1 220 travels via path group 210a. After consolidation, the path manager can instruct the NVMe/PCIe controller 235 to shut down path groups 210b-210c.

The path manager can control or limit Input/Output traffic through smartNIC 205. Prior to shutting down the path groups, the path manager can limit traffic through a namespace, or a path group, so that the path manager can shut down path groups. The path manager may shut down a path group when the path group is no longer forwarding traffic between a namespace and a target server (e.g., target servers 240a-240h). The path manager may shut down a path group if the traffic through the path group, or the namespace, is below a threshold. For example, the path manager may shut down traffic between path group 210h and target server 240h (e.g., shut down path group 210h) in response to a determination that path group 210g can handle the current traffic through namespace 3 230.

Regardless of the amount of traffic, the path manager may leave a minimum number of path groups for each namespace (e.g., one path group per namespace). Each namespace, such as namespace 1 220, namespace 2, 225, or namespace 3 230, can be associated with a single volume and each target server 240a-240h can be a target within a particular volume. For instance, target servers 240d-240f can be block storage targets within a volume associated with namespace 2 225.

The amount of path groups that are shut down can vary between namespaces. For instance, namespace 1 220 can have one active path group (e.g., 210a) and two deactivated path groups (e.g., path groups 210b-210c) because the active path group can have enough bandwidth to support the Input/Output traffic through namespace 1 220. A deactivated path group can be a path group that is not being used to route traffic to a target server. Namespace 2 225 can have two active path groups (e.g., path groups 210d-210e) and one deactivated path group (e.g., path group 210f), because the bandwidth of a single path group is not sufficient to handle the traffic through namespace 2 225. Namespace 3 230 may not be handling any traffic but a single active path group (e.g., path group 210g) can remain to handle any traffic to target servers associated with the volume corresponding to namespace 3 230. Creating, activating, or deactivating path groups can take a period of time and a customer may notice that a request to the volume associated with namespace 3 230 is taking longer than normal because a path group has to be provisioned by the path manager.

Figure 3:
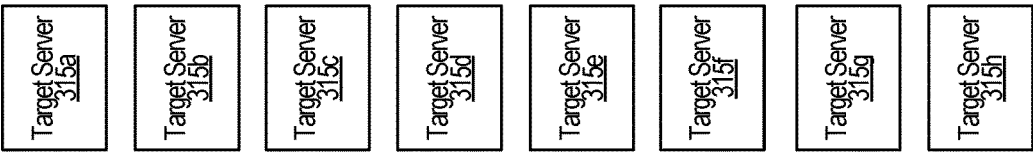
FIG. 3 shows a simplified diagram showing a smart network interface card (smartNIC) during a live upgrade according to various embodiments.

FIG. 3 illustrates a simplified diagram 300 showing a smart network interface card (smartNIC) 305 during a live upgrade according to various embodiments. Diagram 200 can show the number of connections though path groups prior to a live upgrade while diagram 300 can show the smartNIC architecture during a live upgrade when all of the connections through the path groups are deactivated. The deactivated path groups are path groups are shown as path groups 310a-310h that are not connected to any one of target server 315a-315h by a double ended arrow.

A live upgrade can be an update to the software (e.g., firmware) of the smartNIC 305 or any component within the smartNIC. During a live upgrade, all Input/Output traffic through the smartNIC 305 can be shut down and all of path groups 310a-310h can be deactivated by the path manager. A live upgrade can occur during a time period that is sufficiently short that a customer using VM 320 does not notice an interruption in service. The upgrade is "live" because the upgrade can performed while the customer is still using the VM 320. The live upgrade may be delayed or cancelled if the traffic through the smartNIC 305 is above a threshold. A delayed live upgrade can be initiated when the traffic through the smartNIC 305 falls below a threshold.

The connections through path groups 310a-310h can be shut down in an order that is based on a priority assigned to namespaces, path groups, or targets. For instance, namespace 1 325 can be assigned a higher priority than either namespace 2 330, or namespace 335. Accordingly, the connections through path groups 310d-310h can be reduced to a minimum (e.g., one connection per namespace) before the connections through path groups 310a-310c are reduced to a minimum. In addition, the connection though the path group can be restored in an order that is based on a priority for namespace, path groups, or targets.

Figure 4:
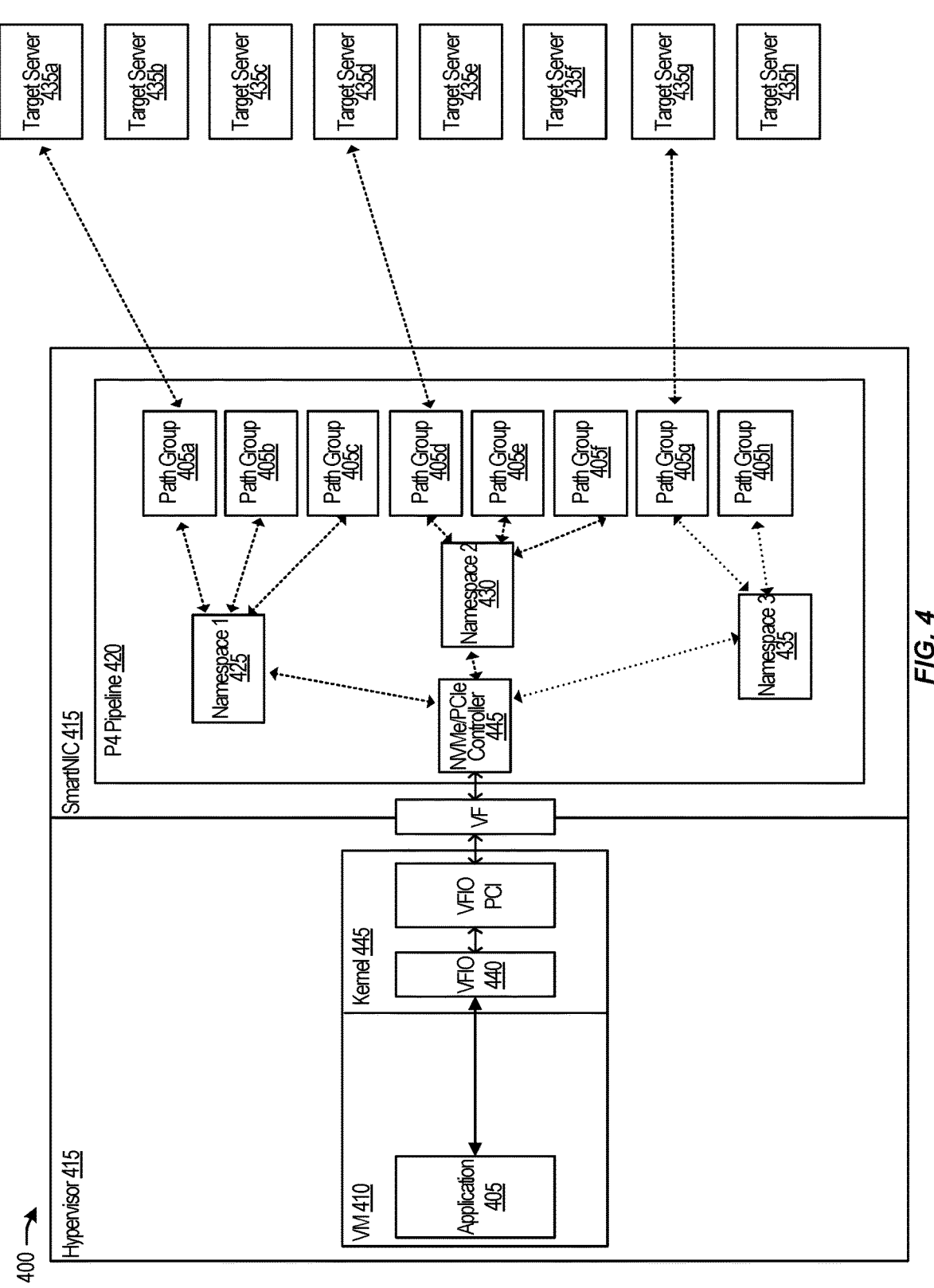
FIG. 4 shows a simplified diagram showing a smart network interface card (smartNIC) that is resuming traffic after a live upgrade according to various embodiments.

FIG. 4 shows a simplified diagram 400 showing a smart network interface card (smartNIC) 415 that is resuming traffic after a live upgrade according to various embodiments. Traffic can be resumed by initiating connections between a path group and a target server. In diagram 400, traffic has been resumed through path group 405a, 405d, and 405g, while traffic has not been resumed through path group 405b, 405c, 405e, 405f, or 405h. Traffic through path groups can be resumed in a reverse of the order in which the path groups were shut down. In some embodiments, traffic can be resumed though one path group per namespace before the connections through other path groups are resumed.

In some embodiments, the path manager in NVMe/PCIe controller 410 can resume traffic to all of the path groups that existed before the smartNIC 415 began to prepare for a live upgrade. The connections can be restored in an order that is based on a priority for one or more of the namespaces, path groups or target servers. Connections through higher priority namespaces, path groups, or servers can be restored before connections through lower priority namespaces, path groups, or servers. A connection can be established for each namespace before the remaining connection are restored in order of priority.

In various embodiments, the P4 pipeline 420 an have a different number or configuration of path groups after the live upgrade. For instance, the number of path groups per namespace can be different because of changes to the demand for Input/Output traffic through one or more of namespace 1 425, namespace 2 430, or namespace 2 435. The demand can be based on the number of Input/Output operations for each namespace in VFIO 440. The changes to the demand can be determined by the NVMe/PCIe controller 445.

The connections between path groups 405a-405h can be resumed in an order that is based on the demand with the connections between path groups and target servers being established for namespaces with a higher number of Input/Output operations in VFIO 440 before the connections are established for namespaces with a smaller number of Input/Output operations in VFIO 440. Traffic through smartNIC 415 can be limited while the connections between path groups and target servers are reestablished (e.g., until the number of Input/Output operations queue in VFIO 440 are below a threshold or until the available bandwidth is above a threshold).

Figure 5:
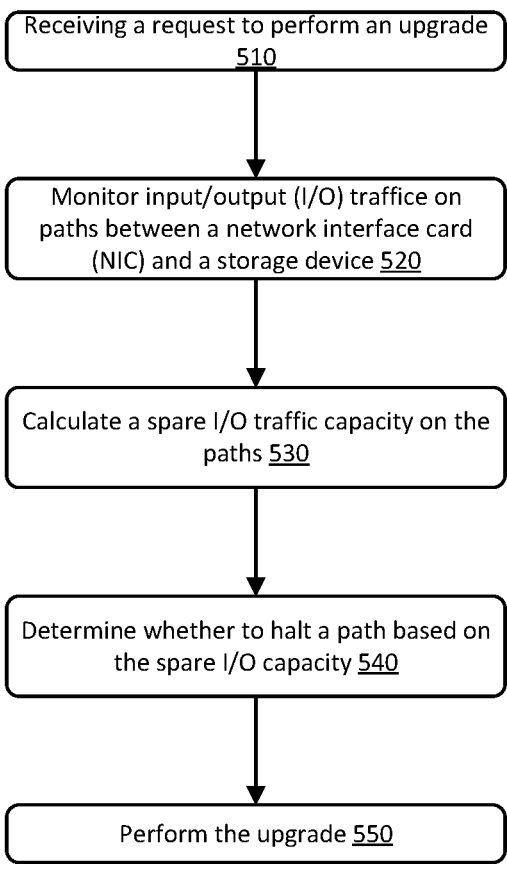
FIG. 5 is a diagram showing a method for performing a live upgrade according to various embodiments.

FIG. 5 is a diagram showing a method 500 for performing a live upgrade according to various embodiments. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to method 500 in greater detail, at block 510, a request to perform an upgrade can be received. The request can be a request to upgrade the software (e.g., firmware) of a network interface card (NIC). The upgrade can comprise changes to the software (e.g., firmware) of the NIC. The request can be for a live upgrade which can be performed in 0.5 seconds or less.

At block 520, monitor the Input/Output (I/O) traffic on paths between a network interface card (NIC) and a storage device. The network interface card can be a smart network interface card (smartNIC), and the storage device can be a persistent storage device that can be formatted into logical block units (e.g., bock storage device). The paths can have a path capacity comprising a bandwidth of I/O traffic per second. The storage device can be part of a storage volume (e.g., a logical drive; a virtual disk that provide persistent block storage space).

Monitoring the Input/Output traffic can include limiting the Input/Output traffic to a first threshold. The first threshold can be a number of I/O operations in the VFIO queue (e.g., VFIO 140 or VFIO 440) or a number of Input/Output operations per second (IOPS). The paths can be path groups 165a-165h, path groups 210a-210h, path groups 310a-310h, or path groups 405-405h. The paths can be monitored by a path monitor in a smartNIC such as smartNIC 190, smartNIC 205, smartNIC 305, or smartNIC 415.

At block 530, calculate a spare I/O capacity on the paths. The spare capacity can be calculated using the I/O traffic from 520 and the path capacity from 520. The spare capacity can be monitored by a path monitor in a smartNIC such as smartNIC 190, smartNIC 205, smartNIC 305, or smartNIC 415. The spare capacity can be a number of I/O operations in the VFIO queue (e.g., VFIO 140 or VFIO 440) or a number of Input/Output operations per second (IOPS).

At block 540, determine whether to remove a path (e.g., path group) based on the spare I/O capacity. The spare I/O capacity can be the spare I/O capacity from 530. The path group may be halted if the I/O traffic along that path group, or multiple path groups, is below a threshold. For example, a path group may be halted from a namespace if the spare capacity for the namespace's path groups is greater than or equal to the bandwidth of a single path group. In such circumstances, the remaining path groups have sufficient bandwidth to handle the remaining traffic for the namespace.

The paths can be halted based on a priority for each path, or each namespace, with low priority paths halted before high priority paths. The priority for a namespace, or a path, can be based on the type of traffic (e.g., the type of Input/Output operations) that are being sent via the namespace or path. The priority may be based on an application that is sending the traffic or the customer that is associated with the application or VM hosting the application. Removing a path, and the upgrade, can be delayed until the Input/Output traffic is below a threshold.

At block 550, performing the upgrade. The upgrade can be performed with the path in halted if, at 540, it was determined that the path should be halted. The upgrade can be performed without removing the path if, at 540, it was determined that the path should not be halted. Removing the path, and the upgrade, may be delayed until the I/O traffic is below a second threshold. The second threshold can be a number of I/O operations in the VFIO queue (e.g., VFIO 140 or VFIO 440) or a number of Input/Output operations per second (IOPS). In some embodiments, the upgrade may be delayed by a fixed period of time (e.g., 20 minutes), and the upgrade may proceed after a fixed number of delays (e.g., the upgrade can proceed after two delays).

The path may be restored after the upgrade has been performed. The upgrade may be performed within a time-frame (e.g., within 0.5 seconds). In some embodiments multiple paths can be halted and the path groups can be restored after the update has been performed. In such embodiments, the path groups may be restored in an order that is the inverse of the order in which the paths were halted (e.g., the last path that was halted is the first path that is restored). In some circumstances, a path may be restored for each namespace before a second path is added to a namespace.

A priority can be assigned to each namespace, and the path groups for the namespaces can be halted and restored in an order that is based on the priority. For example, path groups can be halted from lower priority namespaces before path groups are halted from higher priority namespaces. Continuing the example, path groups can be restored to higher priority namespaces before path groups are restored to lower priority namespaces.

Creating and running a cloud service can include mounting and connecting persistent storage to cloud instances. The persistent storage can be created, using a console or application programming interface (API), and linked to cloud instances (e.g., a virtual machine (VM) host or a bare metal (BM) host running in the cloud). Linking, or attaching, persistent storage to a cloud instance can be performed using a communication protocol. The attached storage can communicate with the cloud instance's guest operating system (OS) using the protocol.

Connections between a cloud instance and persistent storage are flexible and a number of configurations are possible. For instance, the persistent storage can be attached to one or more cloud instances simultaneously. The data in the persistent storage is durable and the storage can retain data after an attachment to a cloud instance is halted. Data can be migrated between instances by detaching persistent storage from one cloud instance and attaching the storage to a second instance.

Durable persistent storage can allow for instance scaling. A cloud instance can be deleted without destroying or reformatting the instance's persistent storage. After the cloud instance is deleted, the instances' persistent storage can be attached to a new instance. The new instance can be created with a different instance type or shape. For example, the new cloud instance can be a VM or a BM regardless of the deleted instance's type. Additionally, the number of cores in a cloud instance can be changed by deleting an initial instance and creating a new instance with a different number of cores.

A transfer of data through an attachment can be started with an endpoint called an initiator. Data can be sent from the initiator to an endpoint that can receive data called a target. An agent can set up the target to receive data and forward the data to the target. A number of advantages can be provided by locating the initiator in a smart network interface card (smartNIC). A user may need to provide login information or other configuration from the cloud instance if the initiator is located in the instance. Additionally, it can be difficult to keep the initiator functional across different guest OS types and OS versions. Locating the initiator in the smartNIC can also free customer resources that would be used to run the initiator.

Attachments can be provided using storage networking standards including Internet Small Computer Systems Interface (iSCSI), paravirtualized (PV) iSCSI, and Non-Volatile Memory Express (NVMe). iSCSI can provide attachments for bare metal (BM) devices with the initiator running from inside a customer instance. The initiator for PV iSCSI attachments can be set up and run inside a cloud instance's hypervisor, and PV iSCSI attachments can be limited to running on virtual machines (VM). The initiator for NVMe attachments can be run on a smartNIC. Accordingly, NVMe attachments can provide attachments for both VM and BM networks.

Figure 6:
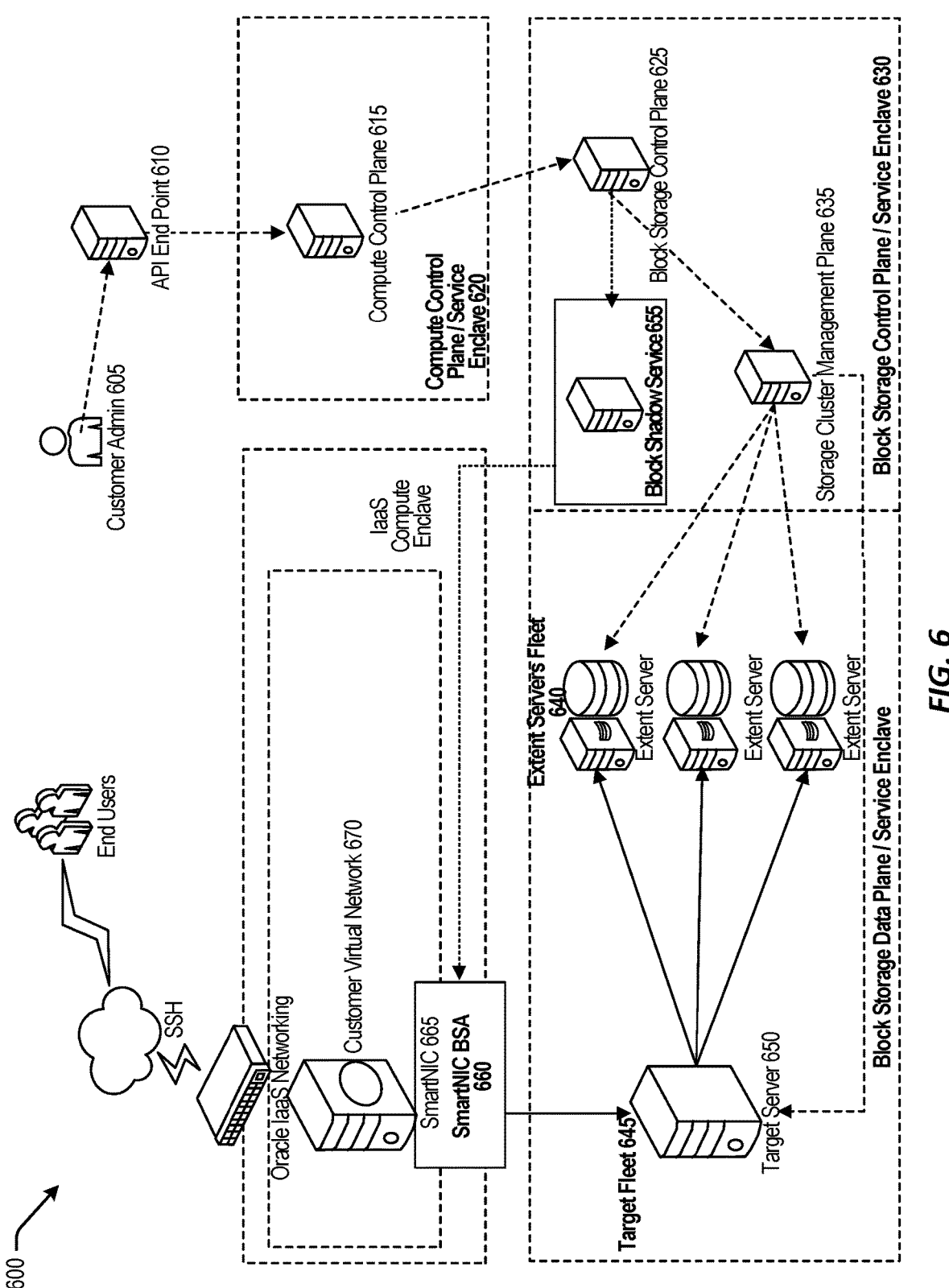
FIG. 6 is a simplified control path diagram showing cloud infrastructure components for attaching persistent storage according to an embodiment.

FIG. 6 is a simplified control path diagram 600 showing cloud infrastructure components for attaching persistent storage, according to an embodiment, for example, using NVMe. A customer administrator 605 can submit a request for a new storage attachment at an application programming interface (API) endpoint 610. In some examples, the customer administrator 605 may be any entity that manages or otherwise administers the use of cloud instances for a customer of the cloud service. In some instances, the API endpoint 610 may be an interface where customer's (e.g., customer administrator 605) can access the cloud service resources, for example, by making requests to have operations performed by the cloud service on resources managed for the customer. The request can be forwarded to the compute control plane 615 in a compute control plane service enclave 620. In some instances, compute control plane 615 can be a series of APIs that can provision, manage, reconfigure, or terminate resources based on user requests. The request can be forwarded from compute control plane 615 to the block storage control plane 625 in the block storage control plane enclave 630. In some examples, the block storage control plane 625 can be a series of APIs that can provision, manage, reconfigure, or terminate block storage.

A request that is received at block storage control plane 625 can be forwarded to the storage cluster management plane 635. Storage cluster management plane 635 can manage the server fleets, and, for example, storage cluster management plane 635 can manage extent server fleet 640 and target server fleet 645. In some examples, storage cluster management plane 635 can configure and monitor extent server fleet 640 or target server fleet 645, and extent server fleet 640 can include servers storing striped and encrypted customer data. Volumes can be striped across multiple extent servers in extent server fleet 640. Extent servers can be a block storage data plane service that handles extent-level I/O and stores the data for replication. In response to the request, storage cluster management plane 635 can identify at least one target server 650 in the target server fleet 645 as a target server for the attachment. In some instances, target server 650 can be a server that manages the flow of customer data to and from extent server fleet 640. Target server 650 can accept I/O requests from a NVMe initiator and send the requests to extent server fleet 640. The storage cluster management plane 635 can select the target server 650 based at least in part on the load experienced by the servers in the target server fleet 645, or the expected volume for the attachment. Storage cluster management plane 635 can forward information about the new attachment to the selected target server 650 or the extent server fleet 640. The information can identify one or more target servers that are able to receive traffic from the new attachment.

The request can be forwarded from block storage control plane 625 to the block shadow service 655. The block shadow service 655 can act as an agent, and block shadow service 655 can communicate with the block smartNIC agent (BSA) 660 in smartNIC 665. In some examples, smartNIC 665 can be hardware that can connect the customer virtual network 670 to other computer networks. BSA 660 can serve as a communication link between block shadow service 655 and an NVMe agent in smartNIC 665. Communication from the block shadow service 655 can provide information about the target server and the attachment to BSA 660. A connection between the customer virtual network 670 and target server fleet 645 can be established by BSA 660. BSA 660 can expose a namespace to the host through host PCIe connection, which can be accessed by the host applications and by the customer through the customer virtual network 670. The customer virtual network 670 can be set up by the VCN, and traffic from customer virtual network 670 can reach extent servers fleet 640 via target server fleet 645 through smartNIC 665.

Figure 7:
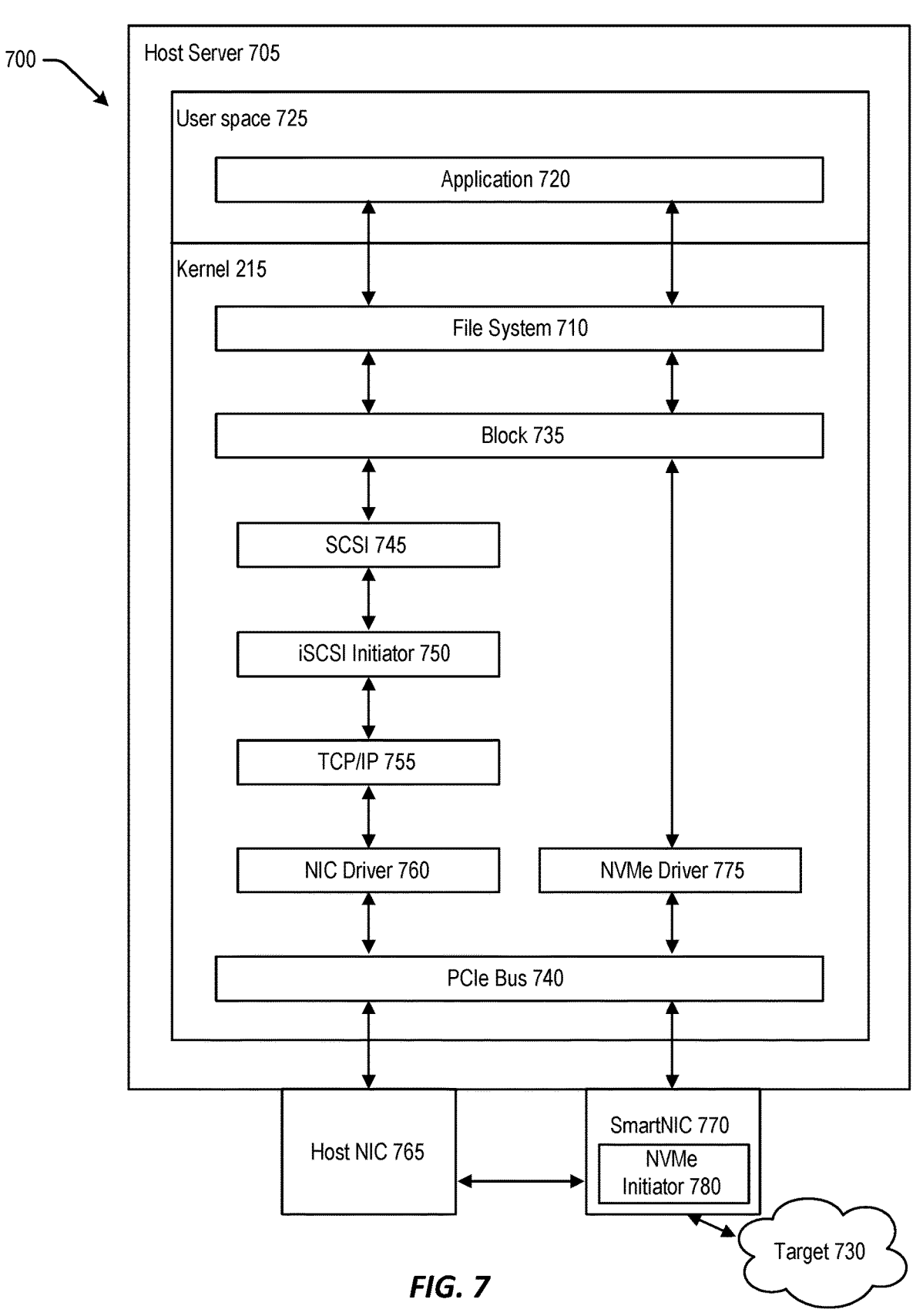
FIG. 7 is a diagram showing a kernel architecture for implementing Internet Small Computer Systems Interface (iSCSI) and Non-Volatile Memory Express (NVMe) attachments according to an embodiment.

FIG. 7 is a diagram 700 showing a kernel architecture for implementing Internet Small Computer Systems Interface (iSCSI) and Non-Volatile Memory Express (NVMe) attachments according to an embodiment. NVMe and iSCSI are networking protocols providing block-level storage access, and both NVMe and iSCSI can be used to attach persistent storage. One difference between the two standards is that, in an iSCSI architecture, Input/Output (I/O) requests reach a smartNIC via a host network interface card (NIC), and, in an NVMe architecture, the smartNIC is directly connected to a Peripheral Component Interconnect Express (PCIe) bus. The NVMe kernel stack can be streamlined compared to the iSCSI stack, and NVMe's simplified architecture can be achieved because the NVMe initiator can be located in the smartNIC.

In a host server 705, using either networking protocol, traffic can reach a file system 710 in the kernel 715 from an application 720 in the user space 725. The traffic can be addressed to a target 730 that can be a block storage server (e.g., target fleet 645, extent servers fleet 640, etc.). Traffic for the two standards can follow similar pathways until the traffic arrives at block 735 from file system 710.

Using iSCSI, traffic from block 735 reaches the PCIe bus 740 via SCSI 745, iSCSI initiator 750, TCP/IP 755, and the NIC driver 760. iSCSI traffic leaving PCIe bus 740 can reach the target via host NIC 765 and smartNIC 770. In some instances, PCIe bus 740 can be a serial computer expansion bus. The NVMe pathway can follow a different pathway, and NVMe traffic can reach PCIe bus 740 from block 735 via NVMe driver 775. Instead of passing through host NIC 765, NVMe traffic can travel from PCIe 740 to smartNIC 770 before reaching target 730. The NVMe initiator 780 can be located in smartNIC 770 instead of being located in kernel 715 like iSCSI initiator 750.

Figure 8:
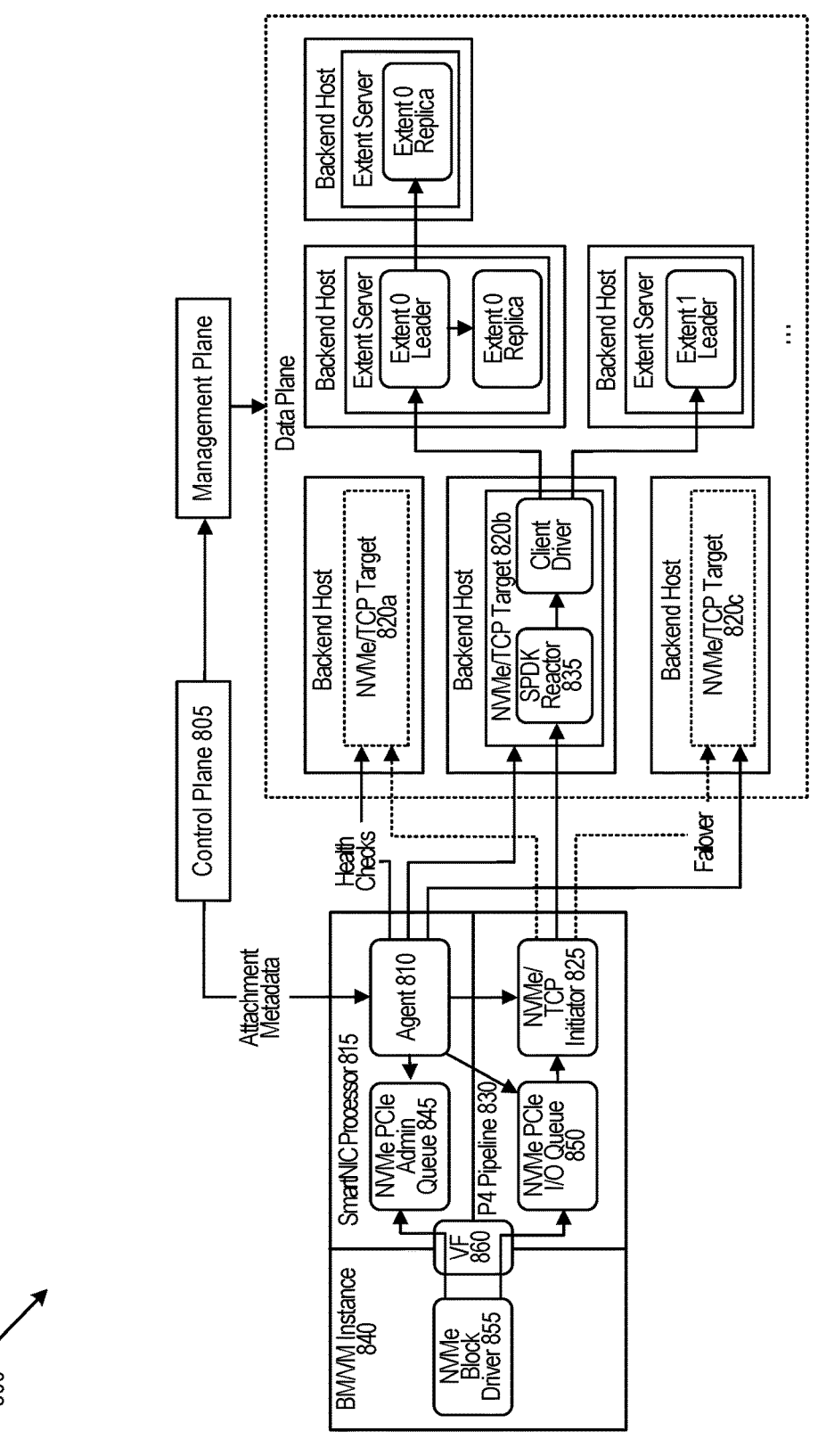
FIG. 8 is a Non-Volatile Memory Express (NVMe) system diagram according to an embodiment.

FIG. 8 is a Non-Volatile Memory Express (NVMe) system diagram 800 according to an embodiment. A customer, such as customer admin 605, can initiate an NVMe attachment request from the console or a public API (e.g., API end point 610). The NVMe attachment request can be forwarded from the control plane 805 (e.g., block storage control plane 625) to an agent 810 (e.g., smartNIC BSA 660) in the smartNIC processor 815. The agent 810 can perform health checks on NVMe/TCP targets 820a-820c to identify healthy targets, and agent 810 can instruct the NVMe/TCP initiator 825 in the Programming Protocol-Independent Packet Processors (P4) pipeline 830 to establish a connection with a healthy NVMe/TCP target (e.g., NVMe/TCP target 820b). P4 is a domain-specific programming language that is optimized for controlling packet forwarding. NVMe/TCP initiator 825 can communicate with Storage Performance Development Kit (SPDK) reactor 835 to initiate the connection.

Once a connection is established with NVMe/TCP target 820b and the NVMe attachment is completed, virtual machine/bare metal (VM/BM) instance 840 can issue NVMe admin commands or NVMe I/O commands to the NVMe/TCP target 820b. The NVMe commands can be issued from BM/VM instance 840 to NVMe PCIe admin queue 845 or NVMe PCIe I/O queue 850 via NVMe block driver 855 and virtual function (VF) 860. In some examples, VF 860 can be a PCIe function that supports single root I/O visualization (SR-IOV). In some instances, the admin queue can be used to establish host-controller associations and the queue can support commands like Identify, Get/Set Features, etc. Agent 810 can retrieve NVMe admin commands from the NVMe PCIe admin queue 845 and forward those commands to NVMe/TCP target 820b, or the commands can be processed locally. I/O commands received from VM/BM instance 840 can be enqueued into NVMe PCIe I/O queue 850. NVMe block driver 855 can retrieve the enqueued commands from NVMe PCIe I/O queue 850 to NVMe/TCP target 820b via NVMe/TCP initiator 825.

Figure 9:
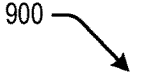
FIG. 9 is a diagram of a Non-Volatile Memory Express (NVMe)/Transmission control Protocol (TCP) target according to an embodiment.
Figure 9:
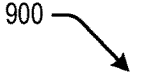

FIG. 9 is a diagram 900 of a Non-Volatile Memory Express (NVMe)/Transmission control Protocol (TCP) target according to an embodiment. The NVMe/TCP target (e.g., NVMe/TCP target 820b) can be a Non-Uniform Memory Access (NUMA) node 905 that can include a central processing unit coupled with memory. Cores in the NUMA node 905 CPU can be assigned to one or more SPDK reactor cores such as SPDK reactor cores 931a-910b (e.g., SPDK reactor 835). Accept poller 915 can accept new connections to the SPDK reactor and assign the new connections to a SPDK reactor core (e.g., SPDK reactor core 910a). Accept Poller 915 can assign new connections to an available TCP poll group 920a-b in an available SPDK reactor core 931a-910b, and the new connections can be assigned using a round robin algorithm.

Subsystem controllers 925a-c can be assigned to a new connection, and, for example, subsystem controller 925a can be assigned for a connection made with TCP poll group 920a. More than one subsystem controller 925a-c can be assigned to one of the TCP poll groups 920a-b, and, for instance, subsystem controller 925a and subsystem controller 925b can be assigned to TCP poll group 920a. Block device namespaces 930a-930c can be generated when a connection is made with one of the subsystem controllers 925a-c.

Threads in a NUMA node CPU can be assigned as client threads 935a-c by one of the block device namespaces. Block device namespaces 930a-930c can forward a request that is received through the new connection to one of the client threads 935*a-c*, and client threads 935*a-c* can decide which extent server 940*a-*940*c* should receive the data associated with the request. After completing the request, client threads 935*a-c* can send a response to message queue 945*a-b* to indicate that a request has been completed. Requests can be received at a SPDK reactor core 931*a-*910*b* from the smartNIC initiator (e.g., NVMe/TCP initiator 825, NVMe initiator 780, etc.) or a different initiator (e.g., iSCSI initiator 750). Responses can be sent from one of the SPDK reactor cores 931*a-*910*b* to the smartNIC initiator or a different initiator.

Figure 10:
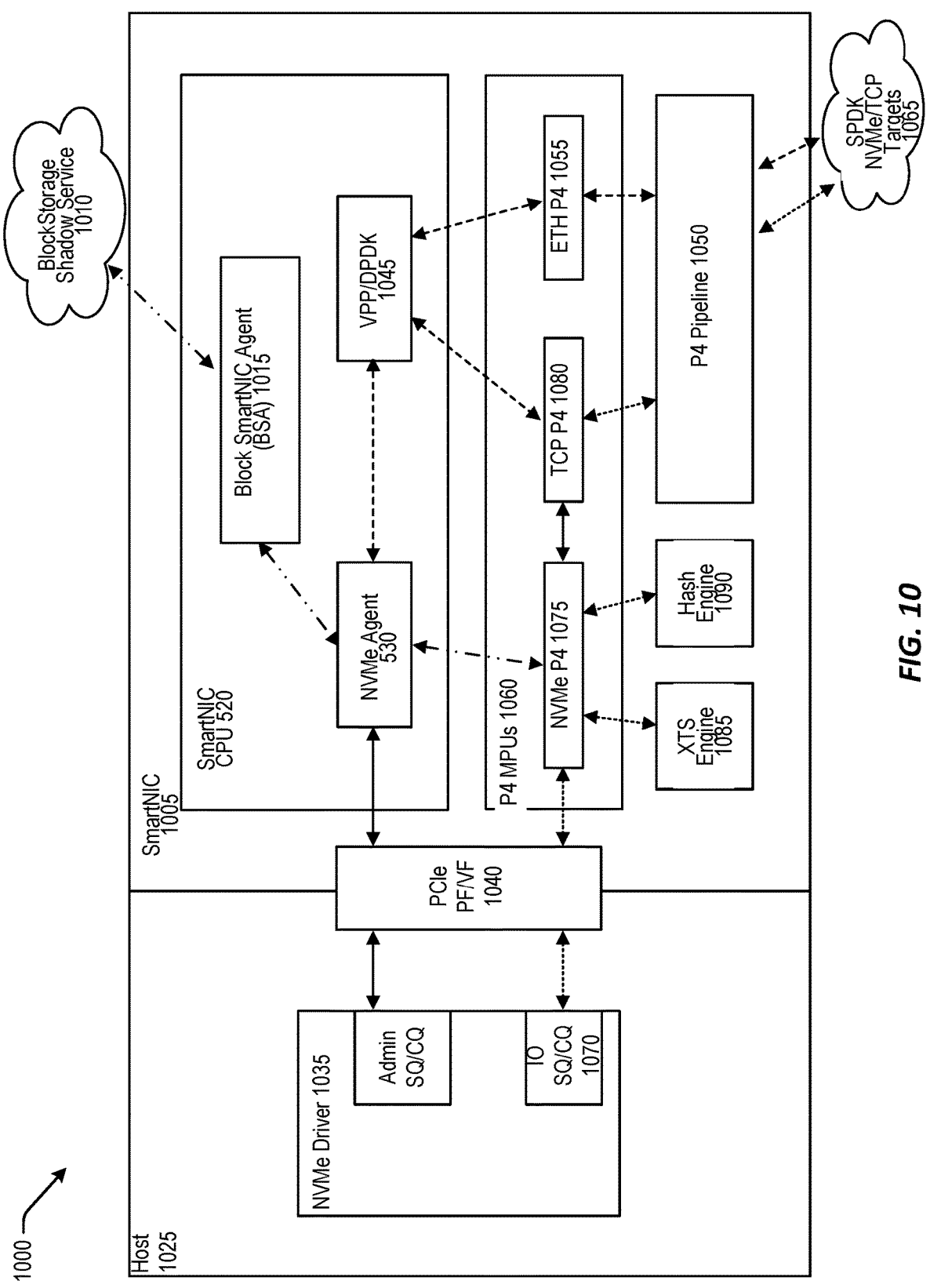
FIG. 10 is a simplified diagram of a smart network interface card (smartNIC) with Non-Volatile Memory Express (NVMe) according to an embodiment.

FIG. 10 is a simplified diagram 1000 of a smart network interface card (smartNIC) with Non-Volatile Memory Express (NVMe) according to an embodiment. Requests can be received at smartNIC 1005 from the block storage shadow service 1010 (e.g., block storage shadow service 655) in the control plane (e.g., block storage control plane 625, control plane 805, etc.). The requests can be received at the block smartNIC agent (BSA) 1015 (e.g., BSA 660) running on the smartNIC central processing unit (CPU) 1020. BSA 1015 can serve a number of functions including performing health checks, ensuring that targets are available, or performing telemetry. BSA 1015 forwards instructions or requests to the host 1025, or other smartNIC components, via NVMe Agent 1030. Requests or instructions can be sent from NVMe Agent 1030 to the NVMe driver 1035 via a PCIe physical function or virtual function (PF/VF) 1040 (e.g., VF 860).

The NVMe agent 1030 can establish a new I/O connection in response to a request from BSA 1015 using the vector packet processing/dataplane development kit (VPP/DPDK) module 1045. The VPP/DPDK module can use a framework, such as VPP with the DPDK plugin, to process and route network packets. Upon receiving a request from NVMe agent 1030, VPP/DPDK 1045 can send a request to the P4 pipeline 1050 (e.g., P4 pipeline 830) via the Ethernet (ETH) P4 module 1055 running on the P4 match protection unit (MPU) 1060. P4 pipeline 1050 can establish an I/O connection with SPDK NVMe/TCP targets 1065 (e.g., target 730, target fleet 645, NVMe/TCP target 820*a-*820*c*, etc.). Establishing a connection can include sending instructions to NVMe driver 1035 or SPDK NVMe/TCP targets 1065

The I/O communication can be offloaded to a fast path I/O pipeline after an I/O connection is established with an SPDK NVMe/TCP target 1065. The I/O fast path traffic can travel along the fast path pipeline from the I/O submission queue/completion queue (SQ/CQ) 1070 in host 1025 to P4 MPUs 1060 via PCIe PF/VF 1040. I/O traffic can be received in P4 MPUs 1060 at NVMe P4 1075 and forwarded to the SPDK NVMe/TCP targets 1065 via TCP P4 1080 and P4 pipeline 1050. Traffic in I/O SQ/CQ 1070 can start from the submission queue and end at the completion queue when I/O completes. If traffic along the fast path pipeline fails, NVMe P4 1075 or TCP P4 1080 can inform NVMe Agent 1030 of the failure. NVMe agent 1030 can be configured so that NVMe agent can create a new I/O connection in response to the failure and offload the new connection to the fast path pipeline. XTS engine 1085 is an encryption engine that can encrypt user data using the xor-encrypt-xor (XEX)-based tweaked-codebook mode with ciphertext stealing (XTS) block cypher, and hash engine 1090 can use cryptographic hash functions to verify data integrity.

Figure 11:
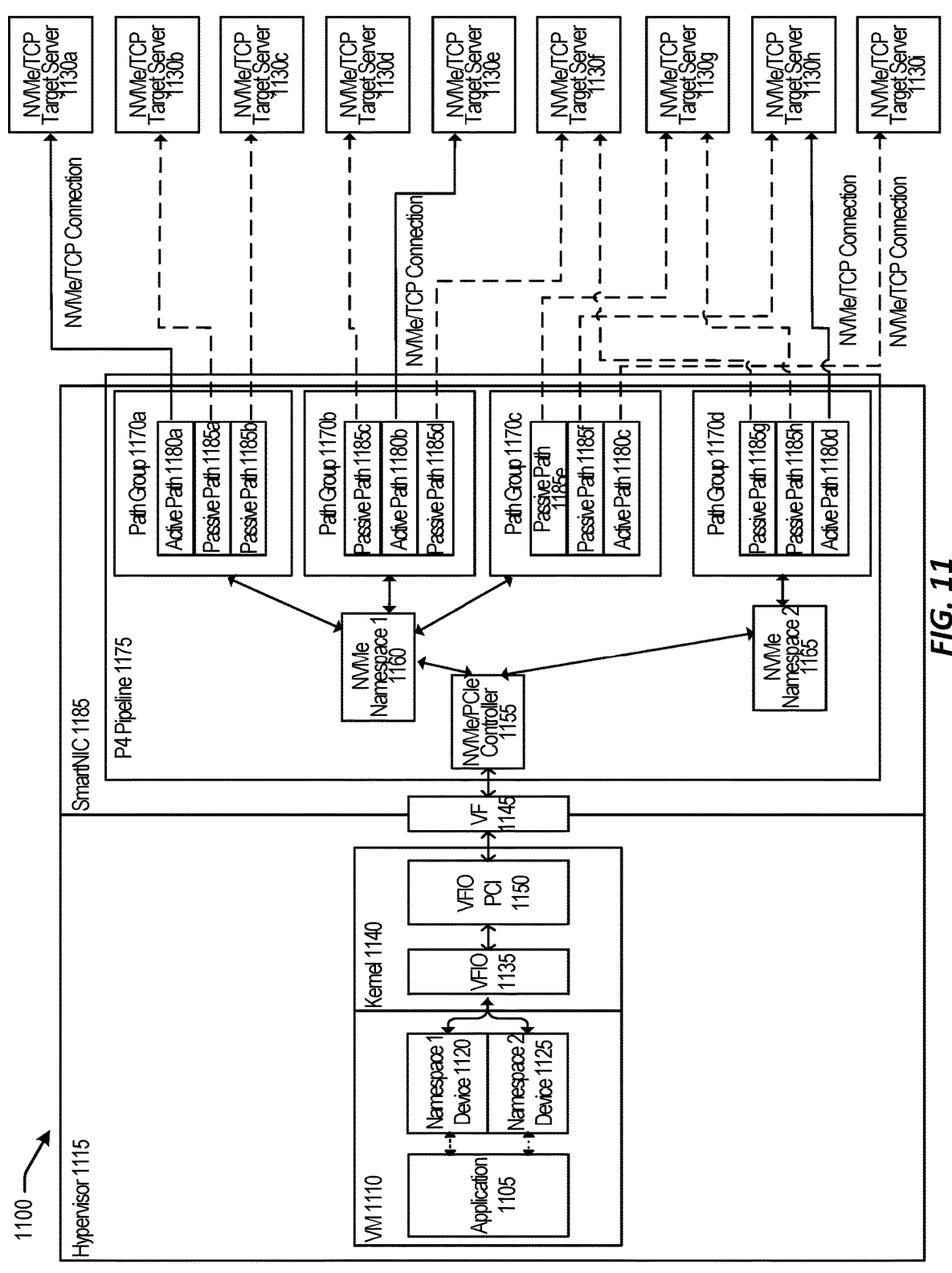
FIG. 11 is a diagram showing multipath handling in a smart network interface card (smartNIC) according to an embodiment.

FIG. 11 is a diagram 1100 showing multipath handling in a smart network interface card (smartNIC) according to an embodiment. An application 1105 can run in a virtual machine (VM) 1110 managed by a hypervisor 1115. Application 1105 can be similar to application 720, and VM 1110 can be a bare metal machine (e.g., BM/VM instance 840). Two namespaces devices, namespace 1 device 1120 and namespace 7 device 1125, can be associated with Application 1105. A namespace can be a NVM storage that is formatted for block access. A namespace can be analogous to a logicHal unit in SCSI, and a block storage volume can be a single namespace. Traffic between namespace 1 1120 or namespace 7 1125 and the NVMe/TCP target servers 1130*a-i* (e.g., target server 650) can be received via the virtual function Input/Output queue (VFIO) 1135 in the kernel 1140. The virtual function (VF) 1145 can be connected to VFIO 1135 via the VFIO peripheral component interconnect (PCI) 1150. VF 1145 can be a virtual function or a physical function.

The NVMe/PCIe controller 1155 can route traffic from the namespace devices to NVMe namespaces. For instance, traffic can be routed between namespace device 1 1120 and NVMe namespace 1 1160, and traffic can be routed between namespace device 7 1125 and NVMe namespace 7 1165. The namespace devices can be associated with one or more path groups 1170*a-d* located in the P4 pipeline 1175 (e.g., P4 pipeline 1050, P4 MPUs 1060, etc.) in smartNIC 1180 (e.g., smartNIC 665, smartNIC 770, smartNIC 1005, etc.). For instance, NVMe namespace 1 1160 can route traffic to path groups 1170*a-*1170*c*, and NVMe namespace 7 1165 can route traffic to path group 1170*d*.

Path groups can contain an active path 1180*a-d* and one or more passive paths 1185*a-*1185*h*. Active paths 1180*a-d* or passive paths 1185*a-*1185*h* can be associated with a NVMe/TCP target server 1130*a-i*. Traffic between a NVMe/TCP target server 1130*a-i* and namespace device 1 1120 or namespace device 7 1125 can be routed via active paths 1180*a-d*. NVMe/TCP target servers 1130*a-i* can route traffic to and from extent servers (e.g., extent servers fleet 640, extent servers 940*a-*940*c*, etc.).

Traffic can be routed via a passive path 1185*a-*1185*h* if an active path 1180*a-d* fails. In response to a failure, passive path 1185*a-*1185*h* can login to an extent server via NVMe/TCP target servers 1130*a-*1130*h*. The extent server can change a token from the token for an active path 1180*a-d* to a token for a passive path 1185*a-*1185*h*. The extent server can use the token to determine whether to accept traffic from a path (e.g., active paths 1180*a-d* or passive paths 1185*a-*1185*h*).

Figure 12:
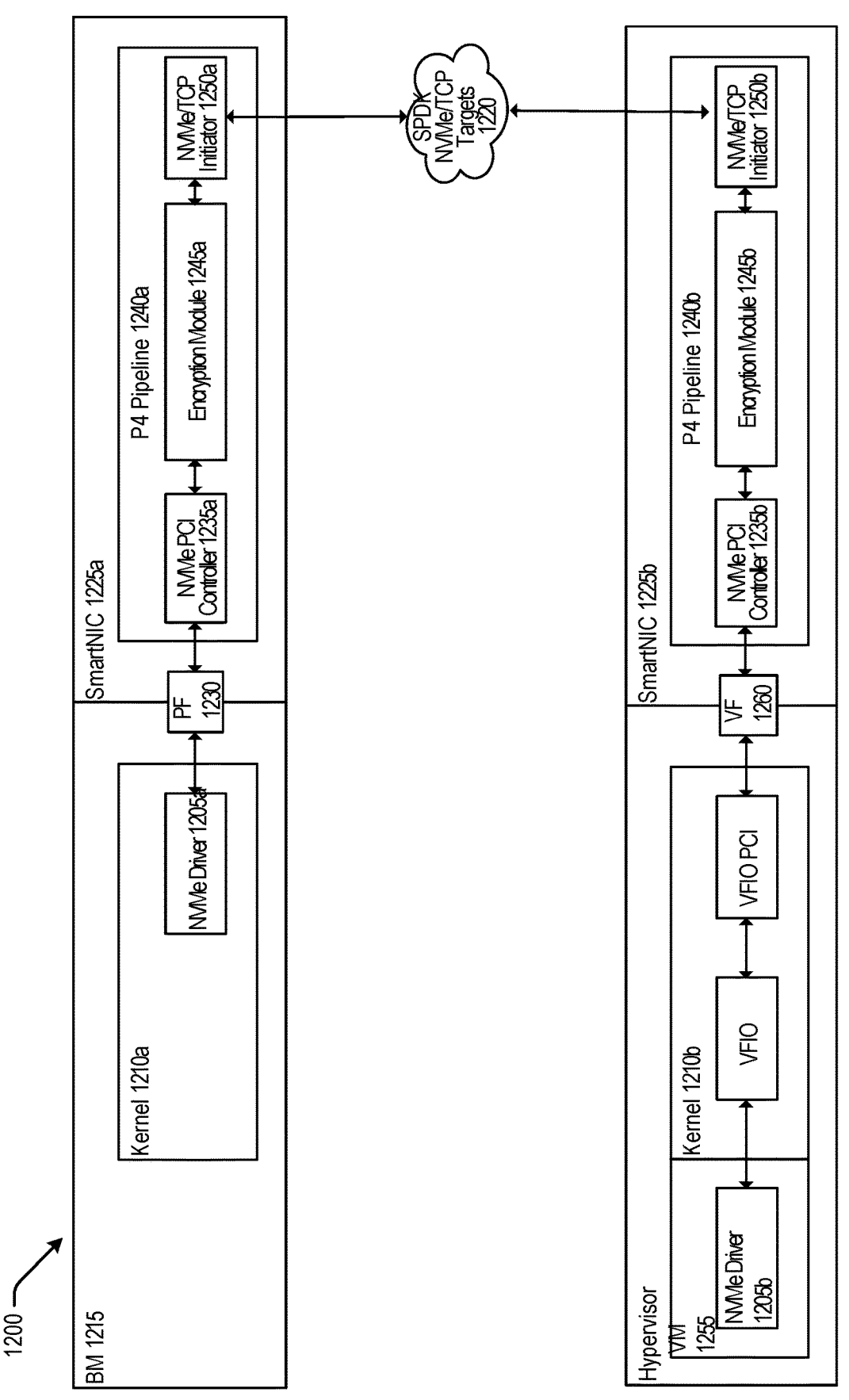
FIG. 12 shows a diagram of an architecture for performing encryption/decryption with a smart network interface card (smartNIC) according to an embodiment.

FIG. 12 shows a diagram of an architecture 1200 for performing encryption/decryption with a smart network interface card (smartNIC) according to an embodiment. The architecture 1200 can provide a unified means for encrypting/decrypting both VM and BM traffic. NVMe driver 1205*a* can run in the kernel 1210*a* of a bare metal (BM) machine 1215 (e.g., BM/VM instance 840, etc.). Traffic can be sent from NVMe driver to SPDK NVMe/TCP targets 1220 via smartNIC 1225*a*. The BM traffic can be received via a physical function (PF) 1230 (e.g., PCIe PF/VF 1040, etc.) at the NVMe PCI controller 1235*a* (e.g., NVMe/PCIe controller 1155, NVMe P4 1075, etc.) in the P4 pipeline 1240*a* (e.g., P4 MPUs 1060, P4 pipeline 1050, etc.).

Outgoing BM traffic traveling from NVMe driver 1205*a* to SPDK NVMe/TCP targets 1220 can be encrypted by the encryption module 1245*a* in smartNIC 1225*a*, and incoming BM traffic can be decrypted by the encryption module 1245*a*. Encryption module 1245*a* can encrypt or decrypt traffic using an encryption algorithm such as Advanced Encryption Standard (AES). The encrypted BM traffic can be sent to SPDK NVMe/TCP targets 1220 via the NVMe/TCP initiator 1250*a* (e.g., NVMe initiator 780, NVMe/TCP initiator 825, etc.). Incoming encrypted BM traffic from SPDK NVMe/TCP targets 1220 can be received at NVMe/TCP initiator 1250*a* before being forwarded along the pathway to NVMe driver 1205*a*. Incoming encrypted BM traffic can be decrypted by the encryption module 1245*a*.

Outgoing VM traffic can be sent from NVMe driver 1205*b* in the virtual machine (VM) 1255 (e.g., BM/VM instance 840, VM 1110, etc.) to the virtual function Input/Output (VFIO) 1260 in kernel 1210*b* via a virtual function (VF) 1260 (e.g., VF 860, VF 1145, etc.). The outgoing VM traffic can be forwarded to NVME PCI controller 1235*b* in P4 pipeline 1240*b*. The outgoing VM traffic can be forwarded from smartNIC 1225*b* to SPDK NVMe/TCP targets 1220 via encryption module 1245*b* and NVMe/TCP initiator 1250*b*. Incoming VM traffic from SPDK NVMe/TCP targets 1220 can be received at NVMe/TCP initiator 1250*b* before the incoming traffic is forwarded along the pathway to NVMe driver 1205*b*. Incoming encrypted VM traffic can be decrypted by the encryption module 1245*a*.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 13:
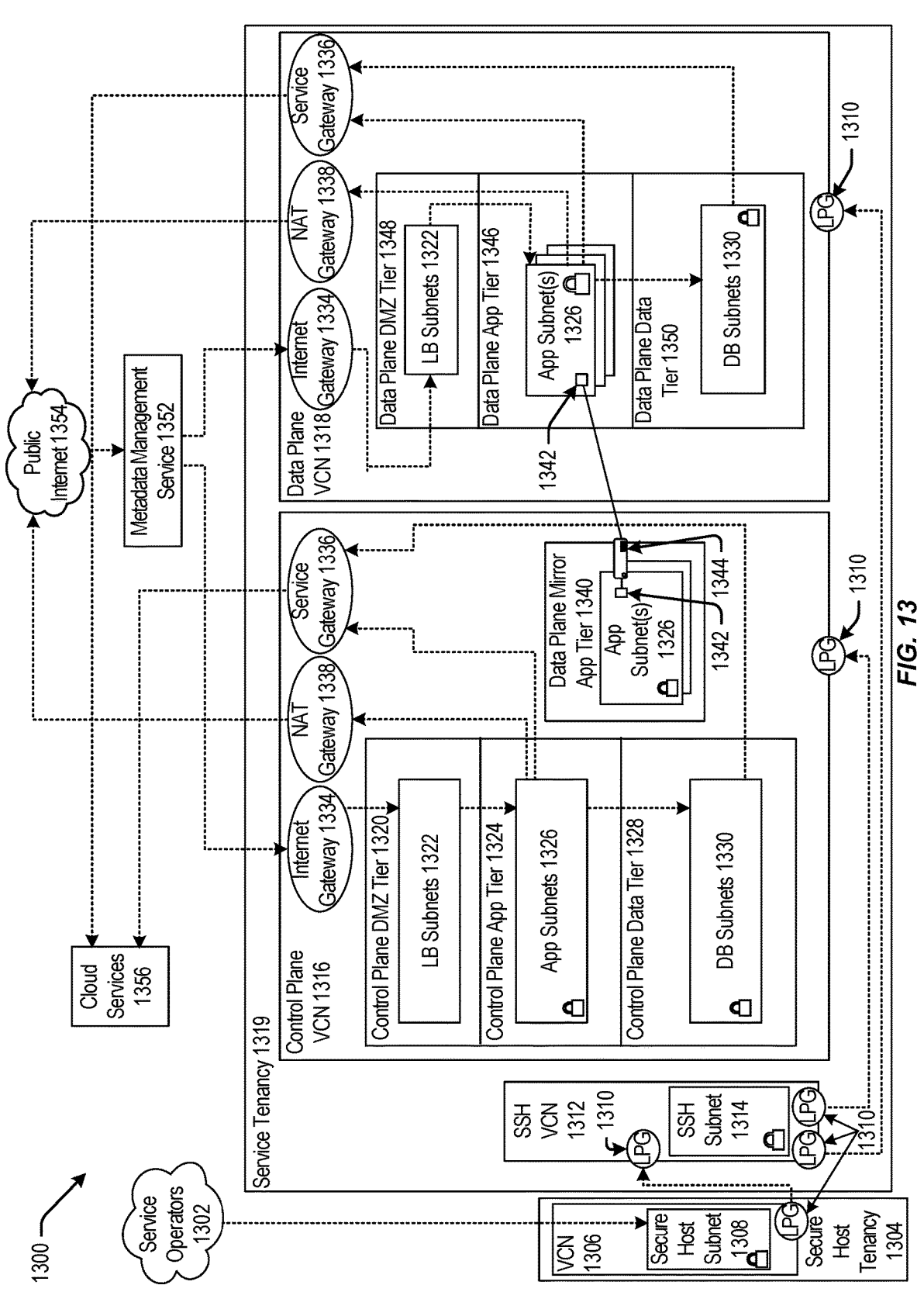
FIG. 13 is a block diagram illustrating one pattern for implementing a cloud infrastructure as a service system, according to at least one embodiment.

FIG. 13 is a block diagram 1300 illustrating an example pattern of an IaaS architecture, according to at least one embodiment. Service operators 1302 can be communicatively coupled to a secure host tenancy 1304 that can include a virtual cloud network (VCN) 1306 and a secure host subnet 1308. In some examples, the service operators 1302 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1306 and/or the Internet.

The VCN 1306 can include a local peering gateway (LPG) 1310 that can be communicatively coupled to a secure shell (SSH) VCN 1312 via an LPG 1310 contained in the SSH VCN 1312. The SSH VCN 1312 can include an SSH subnet 1314, and the SSH VCN 1312 can be communicatively coupled to a control plane VCN 1316 via the LPG 1310 contained in the control plane VCN 1316. Also, the SSH VCN 1312 can be communicatively coupled to a data plane VCN 1318 via an LPG 1310. The control plane VCN 1316 and the data plane VCN 1318 can be contained in a service tenancy 1319 that can be owned and/or operated by the IaaS provider.

The control plane VCN 1316 can include a control plane demilitarized zone (DMZ) tier 1320 that acts as a perimeter network (e.g., portions of a corporate network between the corporate intranet and external networks). The DMZ-based servers may have restricted responsibilities and help keep breaches contained. Additionally, the DMZ tier 1320 can include one or more load balancer (LB) subnet(s) 1322, a control plane app tier 1324 that can include app subnet(s) 1326, a control plane data tier 1328 that can include database (DB) subnet(s) 1330 (e.g., frontend DB subnet(s) and/or backend DB subnet(s)). The LB subnet(s) 1322 contained in the control plane DMZ tier 1320 can be communicatively coupled to the app subnet(s) 1326 contained in the control plane app tier 1324 and an Internet gateway 1334 that can be contained in the control plane VCN 1316, and the app subnet(s) 1326 can be communicatively coupled to the DB subnet(s) 1330 contained in the control plane data tier 1328 and a service gateway 1336 and a network address translation (NAT) gateway 1338. The control plane VCN 1316 can include the service gateway 1336 and the NAT gateway 1338.

The control plane VCN 1316 can include a data plane mirror app tier 1340 that can include app subnet(s) 1326. The app subnet(s) 1326 contained in the data plane mirror app tier 1340 can include a virtual network interface controller (VNIC) 1342 that can execute a compute instance 1344. The compute instance 1344 can communicatively couple the app subnet(s) 1326 of the data plane mirror app tier 1340 to app subnet(s) 1326 that can be contained in a data plane app tier 1346.

The data plane VCN 1318 can include the data plane app tier 1346, a data plane DMZ tier 1348, and a data plane data tier 1350. The data plane DMZ tier 1348 can include LB subnet(s) 1322 that can be communicatively coupled to the app subnet(s) 1326 of the data plane app tier 1346 and the Internet gateway 1334 of the data plane VCN 1318. The app subnet(s) 1326 can be communicatively coupled to the service gateway 1336 of the data plane VCN 1318 and the NAT gateway 1338 of the data plane VCN 1318. The data plane data tier 1350 can also include the DB subnet(s) 1330 that can be communicatively coupled to the app subnet(s) 1326 of the data plane app tier 1346.

The Internet gateway 1334 of the control plane VCN 1316 and of the data plane VCN 1318 can be communicatively coupled to a metadata management service 1352 that can be communicatively coupled to public Internet 1354. Public Internet 1354 can be communicatively coupled to the NAT gateway 1338 of the control plane VCN 1316 and of the data plane VCN 1318. The service gateway 1336 of the control plane VCN 1316 and of the data plane VCN 1318 can be communicatively couple to cloud services 1356.

In some examples, the service gateway 1336 of the control plane VCN 1316 or of the data plane VCN 1318 can make application programming interface (API) calls to cloud services 1356 without going through public Internet 1354. The API calls to cloud services 1356 from the service gateway 1336 can be one-way: the service gateway 1336 can make API calls to cloud services 1356, and cloud services 1356 can send requested data to the service gateway 1336. But, cloud services 1356 may not initiate API calls to the service gateway 1336.

In some examples, the secure host tenancy 1304 can be directly connected to the service tenancy 1319, which may be otherwise isolated. The secure host subnet 1308 can communicate with the SSH subnet 1314 through an LPG 1310 that may enable two-way communication over an otherwise isolated system. Connecting the secure host subnet 1308 to the SSH subnet 1314 may give the secure host subnet 1308 access to other entities within the service tenancy 1319.

The control plane VCN 1316 may allow users of the service tenancy 1319 to set up or otherwise provision desired resources. Desired resources provisioned in the control plane VCN 1316 may be deployed or otherwise used in the data plane VCN 1318. In some examples, the control plane VCN 1316 can be isolated from the data plane VCN 1318, and the data plane mirror app tier 1340 of the control plane VCN 1316 can communicate with the data plane app tier 1346 of the data plane VCN 1318 via VNICs 1342 that can be contained in the data plane mirror app tier 1340 and the data plane app tier 1346.

In some examples, users of the system, or customers, can make requests, for example create, read, update, or delete (CRUD) operations, through public Internet 1354 that can communicate the requests to the metadata management service 1352. The metadata management service 1352 can communicate the request to the control plane VCN 1316 through the Internet gateway 1334. The request can be received by the LB subnet(s) 1322 contained in the control plane DMZ tier 1320. The LB subnet(s) 1322 may determine that the request is valid, and in response to this determination, the LB subnet(s) 1322 can transmit the request to app subnet(s) 1326 contained in the control plane app tier 1324. If the request is validated and requires a call to public Internet 1354, the call to public Internet 1354 may be transmitted to the NAT gateway 1338 that can make the call to public Internet 1354. Metadata that may be desired to be stored by the request can be stored in the DB subnet(s) 1330.

In some examples, the data plane mirror app tier 1340 can facilitate direct communication between the control plane VCN 1316 and the data plane VCN 1318. For example, changes, updates, or other suitable modifications to configuration may be desired to be applied to the resources contained in the data plane VCN 1318. Via a VNIC 1342, the control plane VCN 1316 can directly communicate with, and can thereby execute the changes, updates, or other suitable modifications to configuration to, resources contained in the data plane VCN 1318.

In some embodiments, the control plane VCN 1316 and the data plane VCN 1318 can be contained in the service tenancy 1319. In this case, the user, or the customer, of the system may not own or operate either the control plane VCN 1316 or the data plane VCN 1318. Instead, the IaaS provider may own or operate the control plane VCN 1316 and the data plane VCN 1318, both of which may be contained in the service tenancy 1319. This embodiment can enable isolation of networks that may prevent users or customers from interacting with other users', or other customers', resources. Also, this embodiment may allow users or customers of the system to store databases privately without needing to rely on public Internet 1354, which may not have a desired level of threat prevention, for storage.

In other embodiments, the LB subnet(s) 1322 contained in the control plane VCN 1316 can be configured to receive a signal from the service gateway 1336. In this embodiment, the control plane VCN 1316 and the data plane VCN 1318 may be configured to be called by a customer of the IaaS provider without calling public Internet 1354. Customers of the IaaS provider may desire this embodiment since database(s) that the customers use may be controlled by the IaaS provider and may be stored on the service tenancy 1319, which may be isolated from public Internet 1354.

Figure 14:
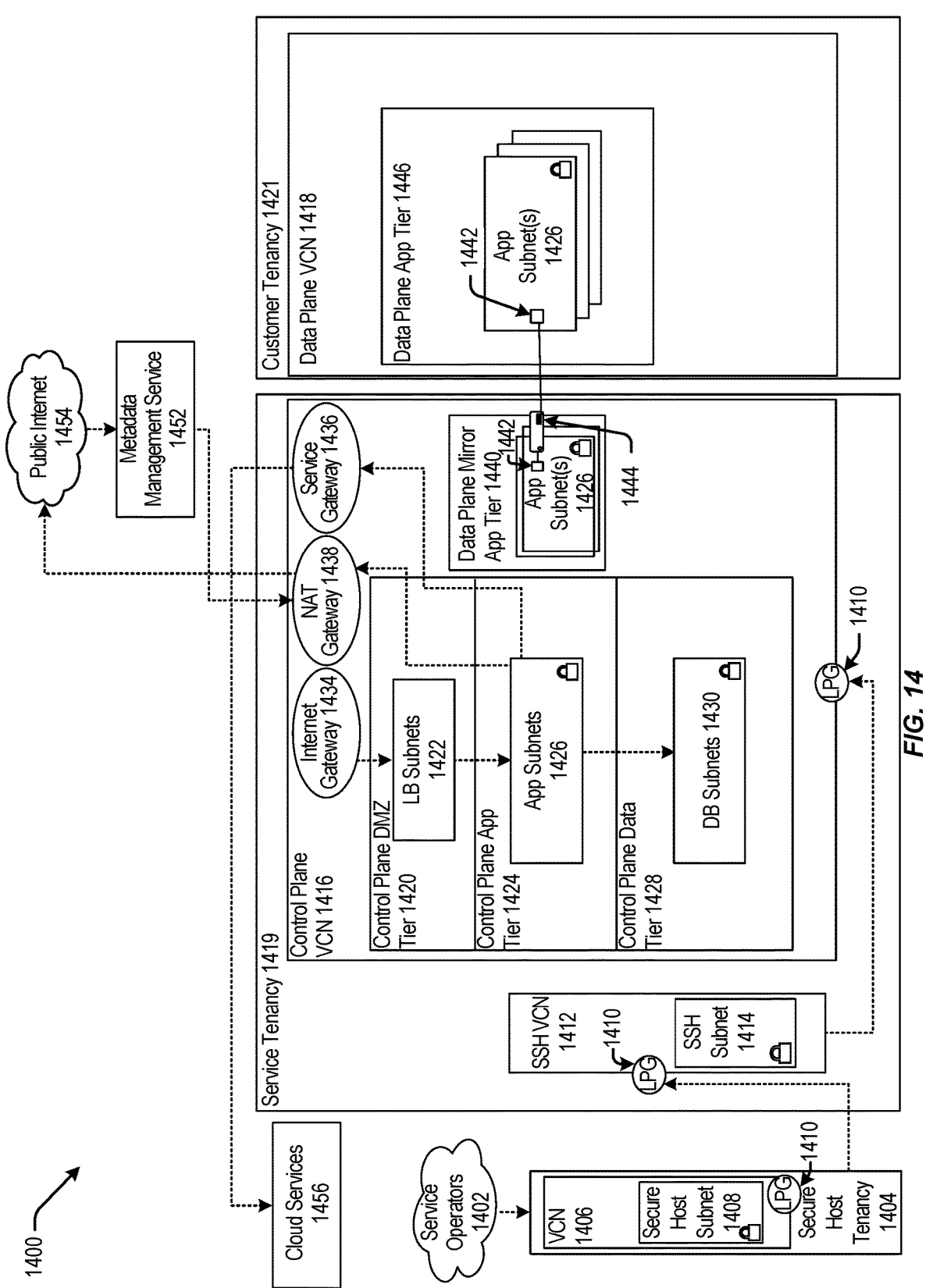
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g., service operators 1302 of FIG. 13) can be communicatively coupled to a secure host tenancy 1404 (e.g., the secure host tenancy 1304 of FIG. 13) that can include a virtual cloud network (VCN) 1406 (e.g., the VCN 1306 of FIG. 13) and a secure host subnet 1408 (e.g., the secure host subnet 1308 of FIG. 13). The VCN 1406 can include a local peering gateway (LPG) 1410 (e.g., the LPG 1310 of FIG. 13) that can be communicatively coupled to a secure shell (SSH) VCN 1412 (e.g., the SSH VCN 1312 of FIG. 13) via an LPG 1310 contained in the SSH VCN 1412. The SSH VCN 1412 can include an SSH subnet 1414 (e.g., the SSH subnet 1314 of FIG. 13), and the SSH VCN 1412 can be communicatively coupled to a control plane VCN 1416 (e.g., the control plane VCN 1316 of FIG. 13) via an LPG 1410 contained in the control plane VCN 1416. The control plane VCN 1416 can be contained in a service tenancy 1419 (e.g., the service tenancy 1319 of FIG. 13), and the data plane VCN 1418 (e.g., the data plane VCN 1318 of FIG. 13) can be contained in a customer tenancy 1421 that may be owned or operated by users, or customers, of the system.

The control plane VCN 1416 can include a control plane DMZ tier 1420 (e.g., the control plane DMZ tier 1320 of FIG. 13) that can include LB subnet(s) 1422 (e.g., LB subnet(s) 1322 of FIG. 13), a control plane app tier 1424 (e.g., the control plane app tier 1324 of FIG. 13) that can include app subnet(s) 1426 (e.g., app subnet(s) 1326 of FIG. 13), a control plane data tier 1428 (e.g., the control plane data tier 1328 of FIG. 13) that can include database (DB) subnet(s) 1430 (e.g., similar to DB subnet(s) 1330 of FIG. 13). The LB subnet(s) 1422 contained in the control plane DMZ tier 1420 can be communicatively coupled to the app subnet(s) 1426 contained in the control plane app tier 1424 and an Internet gateway 1434 (e.g., the Internet gateway 1334 of FIG. 13) that can be contained in the control plane VCN 1416, and the app subnet(s) 1426 can be communicatively coupled to the DB subnet(s) 1430 contained in the control plane data tier 1428 and a service gateway 1436 (e.g., the service gateway 1336 of FIG. 13) and a network address translation (NAT) gateway 1438 (e.g., the NAT gateway 1338 of FIG. 13). The control plane VCN 1416 can include the service gateway 1436 and the NAT gateway 1438.

The control plane VCN 1416 can include a data plane mirror app tier 1440 (e.g., the data plane mirror app tier 1340 of FIG. 13) that can include app subnet(s) 1426. The app subnet(s) 1426 contained in the data plane mirror app tier 1440 can include a virtual network interface controller (VNIC) 1442 (e.g., the VNIC of 1342) that can execute a compute instance 1444 (e.g., similar to the compute instance 1344 of FIG. 13). The compute instance 1444 can facilitate communication between the app subnet(s) 1426 of the data plane mirror app tier 1440 and the app subnet(s) 1426 that can be contained in a data plane app tier 1446 (e.g., the data plane app tier 1346 of FIG. 13) via the VNIC 1442 contained in the data plane mirror app tier 1440 and the VNIC 1442 contained in the data plane app tier 1446.

The Internet gateway 1434 contained in the control plane VCN 1416 can be communicatively coupled to a metadata management service 1452 (e.g., the metadata management service 1352 of FIG. 13) that can be communicatively coupled to public Internet 1454 (e.g., public Internet 1354 of FIG. 13). Public Internet 1454 can be communicatively coupled to the NAT gateway 1438 contained in the control plane VCN 1416. The service gateway 1436 contained in the control plane VCN 1416 can be communicatively couple to cloud services 1456 (e.g., cloud services 1356 of FIG. 13).

In some examples, the data plane VCN 1418 can be contained in the customer tenancy 1421. In this case, the IaaS provider may provide the control plane VCN 1416 for each customer, and the IaaS provider may, for each customer, set up a unique compute instance 1444 that is contained in the service tenancy 1419. Each compute instance 1444 may allow communication between the control plane VCN 1416, contained in the service tenancy 1419, and the data plane VCN 1418 that is contained in the customer tenancy 1421. The compute instance 1444 may allow resources, that are provisioned in the control plane VCN 1416 that is contained in the service tenancy 1419, to be deployed or otherwise used in the data plane VCN 1418 that is contained in the customer tenancy 1421.

In other examples, the customer of the IaaS provider may have databases that live in the customer tenancy 1421. In this example, the control plane VCN 1416 can include the data plane mirror app tier 1440 that can include app subnet(s) 1426. The data plane mirror app tier 1440 can reside in the data plane VCN 1418, but the data plane mirror app tier 1440 may not live in the data plane VCN 1418. That is, the data plane mirror app tier 1440 may have access to the customer tenancy 1421, but the data plane mirror app tier 1440 may not exist in the data plane VCN 1418 or be owned or operated by the customer of the IaaS provider. The data plane mirror app tier 1440 may be configured to make calls to the data plane VCN 1418 but may not be configured to make calls to any entity contained in the control plane VCN 1416. The customer may desire to deploy or otherwise use resources in the data plane VCN 1418 that are provisioned in the control plane VCN 1416, and the data plane mirror app tier 1440 can facilitate the desired deployment, or other usage of resources, of the customer.

In some embodiments, the customer of the IaaS provider can apply filters to the data plane VCN 1418. In this embodiment, the customer can determine what the data plane VCN 1418 can access, and the customer may restrict access to public Internet 1454 from the data plane VCN 1418. The IaaS provider may not be able to apply filters or otherwise control access of the data plane VCN 1418 to any outside networks or databases. Applying filters and controls by the customer onto the data plane VCN 1418, contained in the customer tenancy 1421, can help isolate the data plane VCN 1418 from other customers and from public Internet 1454.

In some embodiments, cloud services 1456 can be called by the service gateway 1436 to access services that may not exist on public Internet 1454, on the control plane VCN 1416, or on the data plane VCN 1418. The connection between cloud services 1456 and the control plane VCN 1416 or the data plane VCN 1418 may not be live or continuous. Cloud services 1456 may exist on a different network owned or operated by the IaaS provider. Cloud services 1456 may be configured to receive calls from the service gateway 1436 and may be configured to not receive calls from public Internet 1454. Some cloud services 1456 may be isolated from other cloud services 1456, and the control plane VCN 1416 may be isolated from cloud services 1456 that may not be in the same region as the control plane VCN 1416. For example, the control plane VCN 1416 may be located in "Region 1," and cloud service "Deployment 13," may be located in Region 1 and in "Region 2." If a call to Deployment 13 is made by the service gateway 1436 contained in the control plane VCN 1416 located in Region 1, the call may be transmitted to Deployment 13 in Region 1. In this example, the control plane VCN 1416, or Deployment 13 in Region 1, may not be communicatively coupled to, or otherwise in communication with, Deployment 13 in Region 2.

Figure 15:
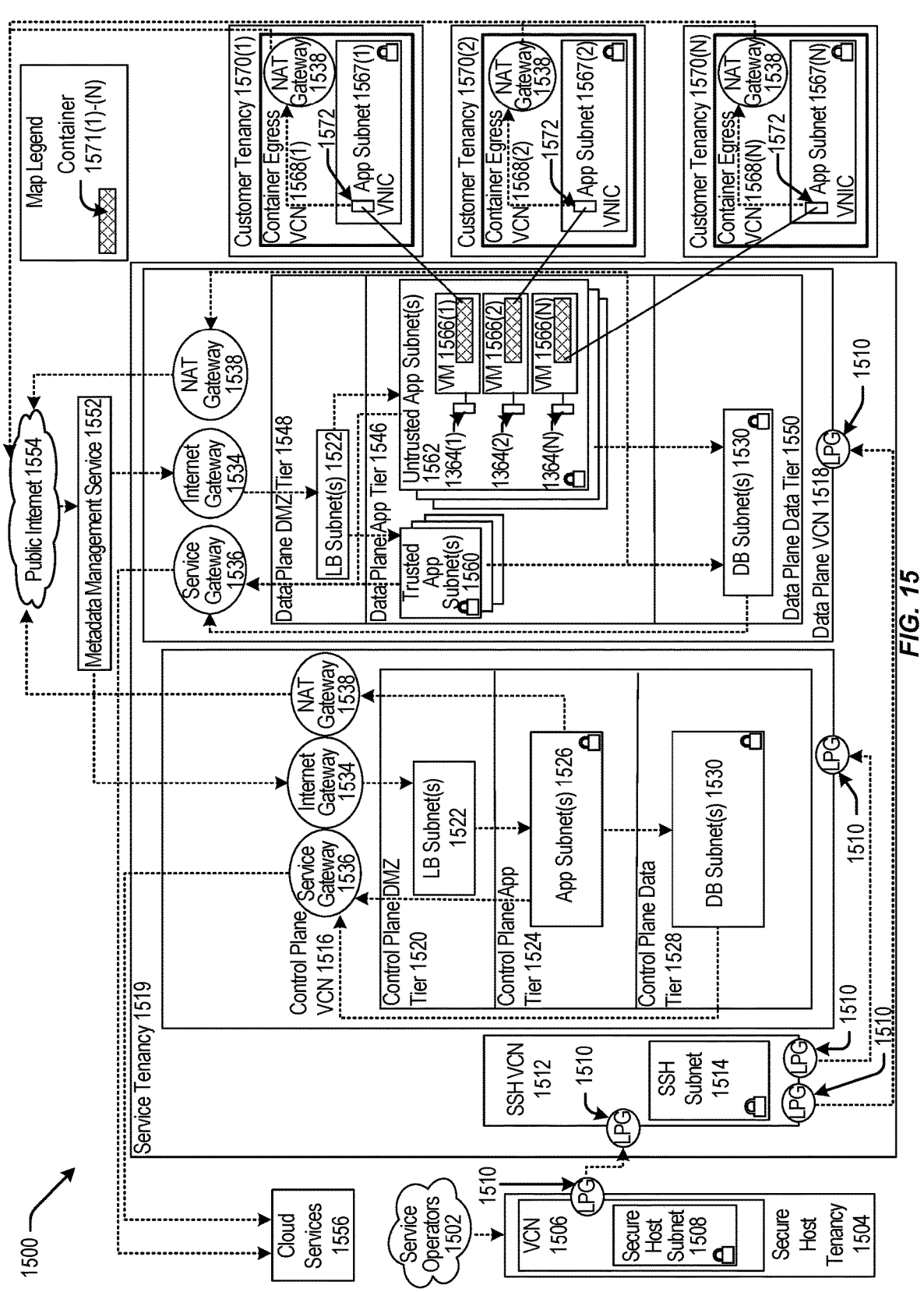
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g., service operators 1302 of FIG. 13) can be communicatively coupled to a secure host tenancy 1504 (e.g., the secure host tenancy 1304 of FIG. 13) that can include a virtual cloud network (VCN) 1506 (e.g., the VCN 1306 of FIG. 13) and a secure host subnet 1508 (e.g., the secure host subnet 1308 of FIG. 13). The VCN 1506 can include an LPG 1510 (e.g., the LPG 1310 of FIG. 13) that can be communicatively coupled to an SSH VCN 1512 (e.g., the SSH VCN 1312 of FIG. 13) via an LPG 1510 contained in the SSH VCN 1512. The SSH VCN 1512 can include an SSH subnet 1514 (e.g., the SSH subnet 1314 of FIG. 13), and the SSH VCN 1512 can be communicatively coupled to a control plane VCN 1516 (e.g., the control plane VCN 1316 of FIG. 13) via an LPG 1510 contained in the control plane VCN 1516 and to a data plane VCN 1518 (e.g., the data plane 1318 of FIG. 13) via an LPG 1510 contained in the data plane VCN 1518. The control plane VCN 1516 and the data plane VCN 1518 can be contained in a service tenancy 1519 (e.g., the service tenancy 1319 of FIG. 13).

The control plane VCN 1516 can include a control plane DMZ tier 1520 (e.g., the control plane DMZ tier 1320 of FIG. 13) that can include load balancer (LB) subnet(s) 1522 (e.g., LB subnet(s) 1322 of FIG. 13), a control plane app tier 1524 (e.g., the control plane app tier 1324 of FIG. 13) that can include app subnet(s) 1526 (e.g., similar to app subnet(s) 1326 of FIG. 13), a control plane data tier 1528 (e.g., the control plane data tier 1328 of FIG. 13) that can include DB subnet(s) 1530. The LB subnet(s) 1522 contained in the control plane DMZ tier 1520 can be communicatively coupled to the app subnet(s) 1526 contained in the control plane app tier 1524 and to an Internet gateway 1534 (e.g., the Internet gateway 1334 of FIG. 13) that can be contained in the control plane VCN 1516, and the app subnet(s) 1526 can be communicatively coupled to the DB subnet(s) 1530 contained in the control plane data tier 1528 and to a service gateway 1536 (e.g., the service gateway of FIG. 13) and a network address translation (NAT) gateway 1538 (e.g., the NAT gateway 1338 of FIG. 13). The control plane VCN 1516 can include the service gateway 1536 and the NAT gateway 1538.

The data plane VCN 1518 can include a data plane app tier 1546 (e.g., the data plane app tier 1346 of FIG. 13), a data plane DMZ tier 1548 (e.g., the data plane DMZ tier 1348 of FIG. 13), and a data plane data tier 1550 (e.g., the data plane data tier 1350 of FIG. 13). The data plane DMZ tier 1548 can include LB subnet(s) 1522 that can be communicatively coupled to trusted app subnet(s) 1560 and untrusted app subnet(s) 1562 of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include one or more primary VNICs 1564(1)-(N) that can be communicatively coupled to tenant virtual machines (VMs) 1566(1)-(N). Each tenant VM 1566(1)-(N) can be communicatively coupled to a respective app subnet 1567(1)-(N) that can be contained in respective container egress VCNs 1568(1)-(N) that can be contained in respective customer tenancies 1570(1)-(N). Respective secondary VNICs 1572(1)-(N) can facilitate communication between the untrusted app subnet(s) 1562 contained in the data plane VCN 1518 and the app subnet contained in the container egress VCNs 1568(1)-(N). Each container egress VCNs 1568(1)-(N) can include a NAT gateway 1538 that can be communicatively coupled to public Internet 1554 (e.g., public Internet 1354 of FIG. 13).

The Internet gateway 1534 contained in the control plane VCN 1516 and contained in the data plane VCN 1518 can be communicatively coupled to a metadata management service 1552 (e.g., the metadata management system 1352 of FIG. 13) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some embodiments, the data plane VCN 1518 can be integrated with customer tenancies 1570. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1546. Code to run the function may be executed in the VMs 1566(1)-(N), and the code may not be configured to run anywhere else on the data plane VCN 1518. Each VM 1566(1)-(N) may be connected to one customer tenancy 1570. Respective containers 1571(1)-(N) contained in the VMs 1566(1)-(N) may be configured to run the code. In this case, there can be a dual isolation (e.g., the containers 1571(1)-(N) running code, where the containers 1571(1)-(N) may be contained in at least the VM 1566(1)-(N) that are contained in the untrusted app subnet(s) 1562), which may help prevent incorrect or otherwise undesirable code from damaging the network of the IaaS provider or from damaging a network of a different customer. The containers 1571 (1)-(N) may be communicatively coupled to the customer tenancy 1570 and may be configured to transmit or receive data from the customer tenancy 1570. The containers 1571 (1)-(N) may not be configured to transmit or receive data from any other entity in the data plane VCN 1518. Upon completion of running the code, the IaaS provider may kill or otherwise dispose of the containers 1571(1)-(N).

In some embodiments, the trusted app subnet(s) 1560 may run code that may be owned or operated by the IaaS provider. In this embodiment, the trusted app subnet(s) 1560 may be communicatively coupled to the DB subnet(s) 1530 and be configured to execute CRUD operations in the DB subnet(s) 1530. The untrusted app subnet(s) 1562 may be communicatively coupled to the DB subnet(s) 1530, but in this embodiment, the untrusted app subnet(s) may be configured to execute read operations in the DB subnet(s) 1530. The containers 1571(1)-(N) that can be contained in the VM 1566(1)-(N) of each customer and that may run code from the customer may not be communicatively coupled with the DB subnet(s) 1530.

In other embodiments, the control plane VCN 1516 and the data plane VCN 1518 may not be directly communicatively coupled. In this embodiment, there may be no direct communication between the control plane VCN 1516 and the data plane VCN 1518. However, communication can occur indirectly through at least one method. An LPG 1510 may be established by the IaaS provider that can facilitate communication between the control plane VCN 1516 and the data plane VCN 1518. In another example, the control plane VCN 1516 or the data plane VCN 1518 can make a call to cloud services 1556 via the service gateway 1536. For example, a call to cloud services 1556 from the control plane VCN 1516 can include a request for a service that can communicate with the data plane VCN 1518.

Figure 16:
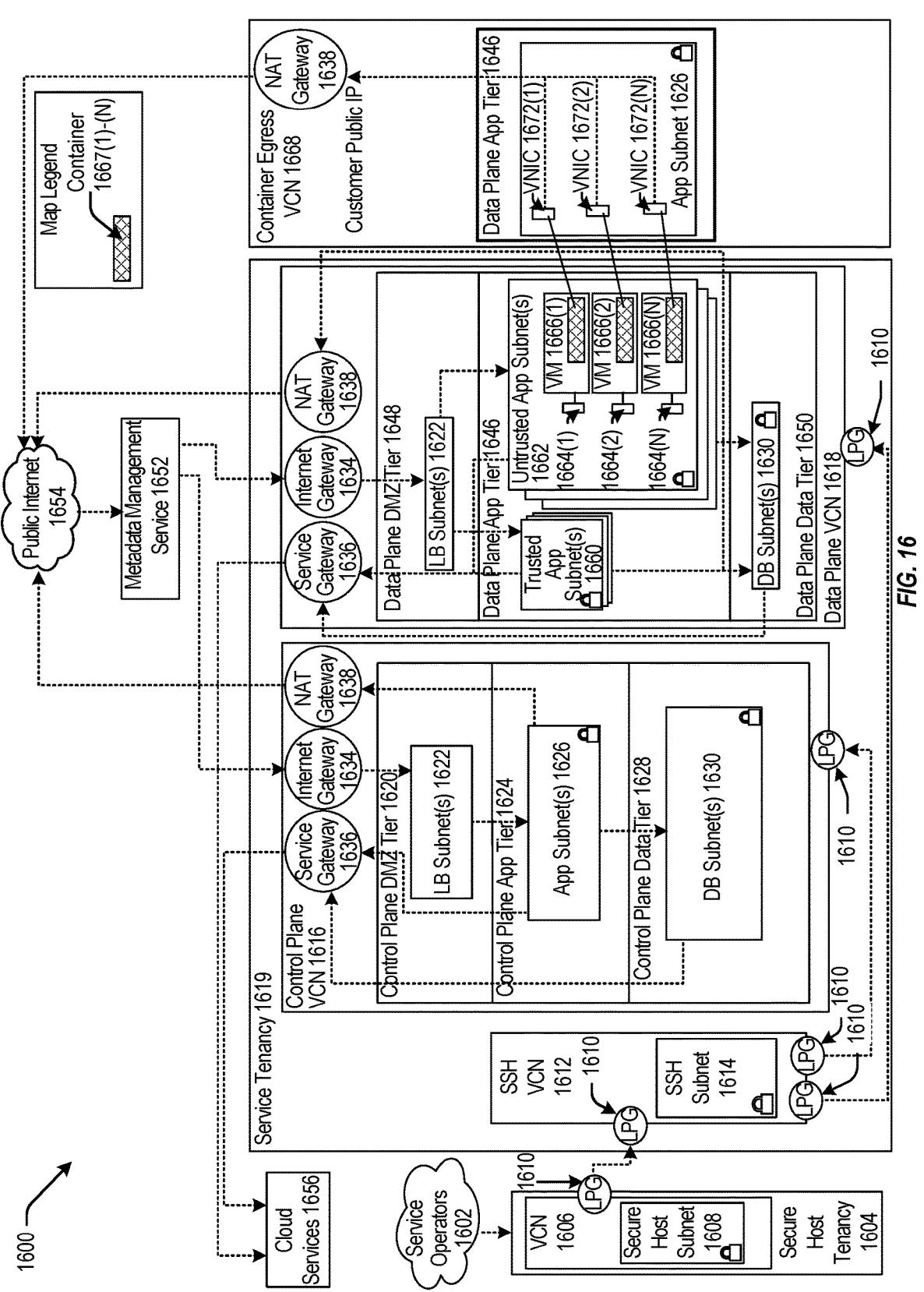
FIG. 16 is a block diagram illustrating another pattern for implementing a cloud infrastructure as a service system, according to at least one embodiment.

FIG. 16 is a block diagram 1600 illustrating another example pattern of an IaaS architecture, according to at least one embodiment. Service operators 1602 (e.g., service operators 1302 of FIG. 13) can be communicatively coupled to a secure host tenancy 1604 (e.g., the secure host tenancy 1304 of FIG. 13) that can include a virtual cloud network (VCN) 1606 (e.g., the VCN 1306 of FIG. 13) and a secure host subnet 1608 (e.g., the secure host subnet 1308 of FIG. 13). The VCN 1606 can include an LPG 1610 (e.g., the LPG 1310 of FIG. 13) that can be communicatively coupled to an SSH VCN 1612 (e.g., the SSH VCN 1312 of FIG. 13) via an LPG 1610 contained in the SSH VCN 1612. The SSH VCN 1612 can include an SSH subnet 1614 (e.g., the SSH subnet 1314 of FIG. 13), and the SSH VCN 1612 can be communicatively coupled to a control plane VCN 1616 (e.g., the control plane VCN 1316 of FIG. 13) via an LPG 1610 contained in the control plane VCN 1616 and to a data plane VCN 1618 (e.g., the data plane 1318 of FIG. 13) via an LPG 1610 contained in the data plane VCN 1618. The control plane VCN 1616 and the data plane VCN 1618 can be contained in a service tenancy 1619 (e.g., the service tenancy 1319 of FIG. 13).

The control plane VCN 1616 can include a control plane DMZ tier 1620 (e.g., the control plane DMZ tier 1320 of FIG. 13) that can include LB subnet(s) 1622 (e.g., LB subnet(s) 1322 of FIG. 13), a control plane app tier 1624 (e.g., the control plane app tier 1324 of FIG. 13) that can include app subnet(s) 1626 (e.g., app subnet(s) 1326 of FIG. 13), a control plane data tier 1628 (e.g., the control plane data tier 1328 of FIG. 13) that can include DB subnet(s) 1630 (e.g., DB subnet(s) 1530 of FIG. 15). The LB subnet(s) 1622 contained in the control plane DMZ tier 1620 can be communicatively coupled to the app subnet(s) 1626 contained in the control plane app tier 1624 and to an Internet gateway 1634 (e.g., the Internet gateway 1334 of FIG. 13) that can be contained in the control plane VCN 1616, and the app subnet(s) 1626 can be communicatively coupled to the DB subnet(s) 1630 contained in the control plane data tier 1628 and to a service gateway 1636 (e.g., the service gateway of FIG. 13) and a network address translation (NAT) gateway 1638 (e.g., the NAT gateway 1338 of FIG. 13). The control plane VCN 1616 can include the service gateway 1636 and the NAT gateway 1638.

The data plane VCN 1618 can include a data plane app tier 1646 (e.g., the data plane app tier 1346 of FIG. 13), a data plane DMZ tier 1648 (e.g., the data plane DMZ tier 1348 of FIG. 13), and a data plane data tier 1650 (e.g., the data plane data tier 1350 of FIG. 13). The data plane DMZ tier 1648 can include LB subnet(s) 1622 that can be communicatively coupled to trusted app subnet(s) 1660 (e.g., trusted app subnet(s) 1560 of FIG. 15) and untrusted app subnet(s) 1662 (e.g., untrusted app subnet(s) 1562 of FIG. 15) of the data plane app tier 1646 and the Internet gateway 1634 contained in the data plane VCN 1618. The trusted app subnet(s) 1660 can be communicatively coupled to the service gateway 1636 contained in the data plane VCN 1618, the NAT gateway 1638 contained in the data plane VCN 1618, and DB subnet(s) 1630 contained in the data plane data tier 1650. The untrusted app subnet(s) 1662 can be communicatively coupled to the service gateway 1636 contained in the data plane VCN 1618 and DB subnet(s) 1630 contained in the data plane data tier 1650. The data plane data tier 1650 can include DB subnet(s) 1630 that can be communicatively coupled to the service gateway 1636 contained in the data plane VCN 1618.

The untrusted app subnet(s) 1662 can include primary VNICs 1664(1)-(N) that can be communicatively coupled to tenant virtual machines (VMs) 1666(1)-(N) residing within the untrusted app subnet(s) 1662. Each tenant VM 1666(1)-(N) can run code in a respective container 1667(1)-(N), and be communicatively coupled to an app subnet 1626 that can be contained in a data plane app tier 1646 that can be contained in a container egress VCN 1668. Respective secondary VNICs 1672(1)-(N) can facilitate communication between the untrusted app subnet(s) 1662 contained in the data plane VCN 1618 and the app subnet contained in the container egress VCN 1668. The container egress VCN can include a NAT gateway 1638 that can be communicatively coupled to public Internet 1654 (e.g., public Internet 1354 of FIG. 13).

The Internet gateway 1634 contained in the control plane VCN 1616 and contained in the data plane VCN 1618 can be communicatively coupled to a metadata management service 1652 (e.g., the metadata management system 1352 of FIG. 13) that can be communicatively coupled to public Internet 1654. Public Internet 1654 can be communicatively coupled to the NAT gateway 1638 contained in the control plane VCN 1616 and contained in the data plane VCN 1618. The service gateway 1636 contained in the control plane VCN 1616 and contained in the data plane VCN 1618 can be communicatively couple to cloud services 1656.

In some examples, the pattern illustrated by the architecture of block diagram 1600 of FIG. 16 may be considered an exception to the pattern illustrated by the architecture of block diagram 1500 of FIG. 15 and may be desirable for a customer of the IaaS provider if the IaaS provider cannot directly communicate with the customer (e.g., a disconnected region). The respective containers 1667(1)-(N) that are contained in the VMs 1666(1)-(N) for each customer can be accessed in real-time by the customer. The containers 1667(1)-(N) may be configured to make calls to respective secondary VNICs 1672(1)-(N) contained in app subnet(s) 1626 of the data plane app tier 1646 that can be contained in the container egress VCN 1668. The secondary VNICs 1672(1)-(N) can transmit the calls to the NAT gateway 1638 that may transmit the calls to public Internet 1654. In this example, the containers 1667(1)-(N) that can be accessed in real-time by the customer can be isolated from the control plane VCN 1616 and can be isolated from other entities contained in the data plane VCN 1618. The containers 1667(1)-(N) may also be isolated from resources from other customers.

In other examples, the customer can use the containers 1667(1)-(N) to call cloud services 1656. In this example, the customer may run code in the containers 1667(1)-(N) that requests a service from cloud services 1656. The containers 1667(1)-(N) can transmit this request to the secondary VNICs 1672(1)-(N) that can transmit the request to the NAT gateway that can transmit the request to public Internet 1654. Public Internet 1654 can transmit the request to LB subnet(s) 1622 contained in the control plane VCN 1616 via the Internet gateway 1634. In response to determining the request is valid, the LB subnet(s) can transmit the request to app subnet(s) 1626 that can transmit the request to cloud services 1656 via the service gateway 1636.

It should be appreciated that IaaS architectures 1300, 1400, 1500, 1600 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 17:
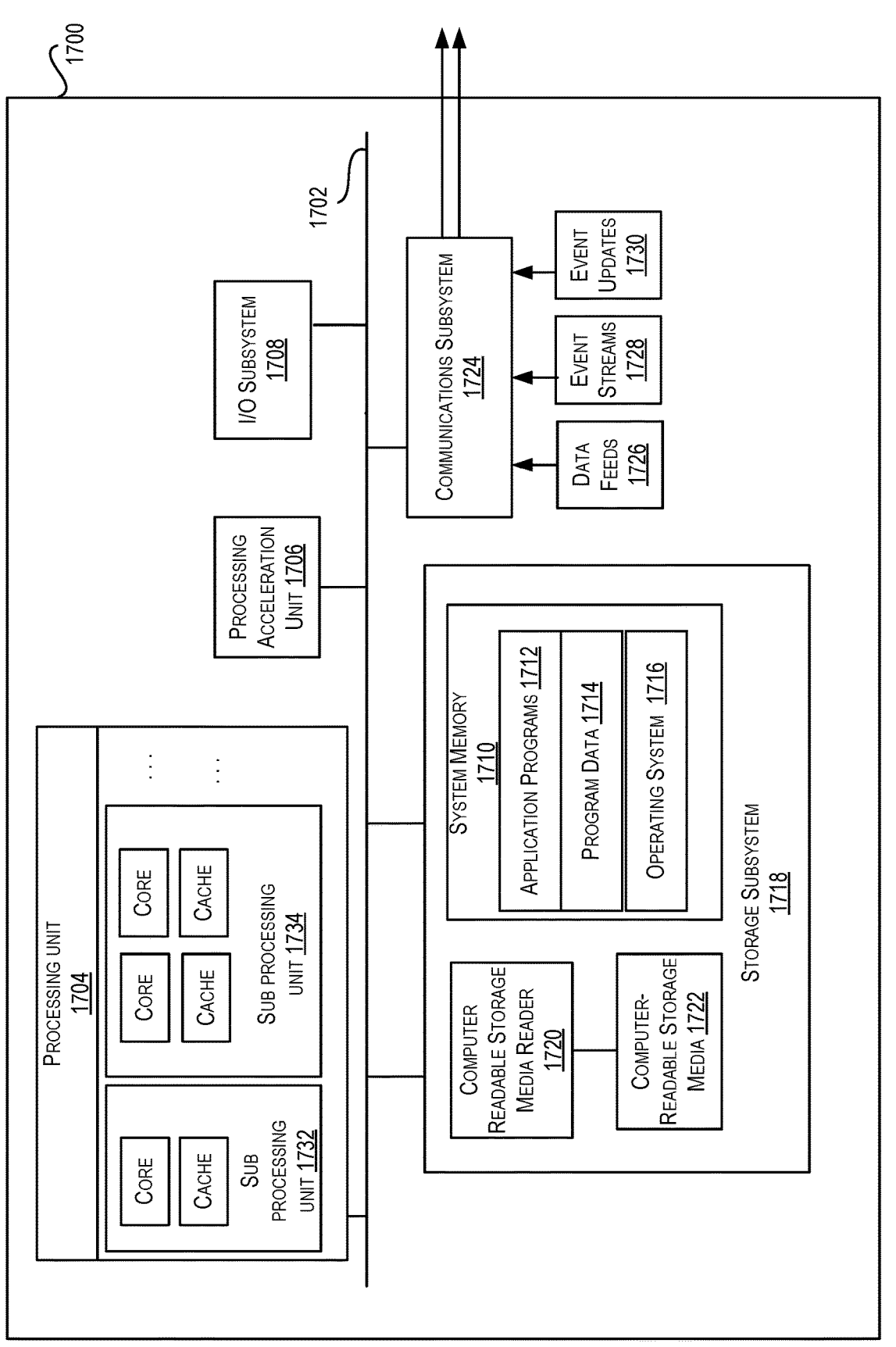

FIG. 17 illustrates an example computer system 1700, in which various embodiments may be implemented. The system 1700 may be used to implement any of the computer systems described above. As shown in the figure, computer system 1700 includes a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 includes tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1704, which can be implemented as one or more integrated circuits (e.g., a conventional microprocessor or microcontroller), controls the operation of computer system 1700. One or more processors may be included in processing unit 1704. These processors may include single core or multicore processors. In certain embodiments, processing unit 1704 may be implemented as one or more independent processing units 1732 and/or 1734 with single or multicore processors included in each processing unit. In other embodiments, processing unit 1704 may also be implemented as a quad-core processing unit formed by integrating two dual-core processors into a single chip.

In various embodiments, processing unit 1704 can execute a variety of programs in response to program code and can maintain multiple concurrently executing programs or processes. At any given time, some or all of the program code to be executed can be resident in processor(s) 1704 and/or in storage subsystem 1718. Through suitable programming, processor(s) 1704 can provide various functionalities described above. Computer system 1700 may additionally include a processing acceleration unit 1706, which can include a digital signal processor (DSP), a special-purpose processor, and/or the like.

I/O subsystem 1708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1700 may comprise a storage subsystem 1718 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1704 provide the functionality described above. Storage subsystem 1718 may also provide a repository for storing data used in accordance with the present disclosure.

As depicted in the example in FIG. 17, storage subsystem 1718 can include various components including a system memory 1710, computer-readable storage media 1722, and a computer readable storage media reader 1720. System memory 1710 may store program instructions that are loadable and executable by processing unit 1704. System memory 1710 may also store data that is used during the execution of the instructions and/or data that is generated during the execution of the program instructions. Various different kinds of programs may be loaded into system memory 1710 including but not limited to client applications, Web browsers, mid-tier applications, relational database management systems (RDBMS), virtual machines, containers, etc.

System memory 1710 may also store an operating system 1716. Examples of operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1700 executes one or more virtual machines, the virtual machines along with their guest operating systems (GOSs) may be loaded into system memory 1710 and executed by one or more processors or cores of processing unit 1704.

System memory 1710 can come in different configurations depending upon the type of computer system 1700. For example, system memory 1710 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1710 may include a basic input/output system (BIOS) containing basic routines that help to transfer information between elements within computer system 1700, such as during start-up.

Computer-readable storage media 1722 may represent remote, local, fixed, and/or removable storage devices plus storage media for temporarily and/or more permanently containing, storing, computer-readable information for use by computer system 1700 including instructions executable by processing unit 1704 of computer system 1700.

Computer-readable storage media 1722 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1700.

Machine-readable instructions executable by one or more processors or cores of processing unit 1704 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to connect to one or more devices via the Internet. In some embodiments communications subsystem 1724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1724 can provide wired network connectivity (e.g., Ethernet) in addition to or instead of a wireless interface.

In some embodiments, communications subsystem 1724 may also receive input communication in the form of structured and/or unstructured data feeds 1726, event streams 1728, event updates 1730, and the like on behalf of one or more users who may use computer system 1700.

By way of example, communications subsystem 1724 may be configured to receive data feeds 1726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1724 may also be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method:

receiving, by a network interface card (NIC), a request to perform an upgrade, the upgrade comprising changes to software of the network interface card;

monitoring, by the network interface card, Input/Output (I/O) traffic on one or more paths between the network interface card and a storage device, each path of the one or more paths having a path capacity comprising a bandwidth of Input/Output traffic;

calculating, by the network interface card, a spare Input/Output traffic capacity for at least one path of the one or more paths between the network interface card and the storage device based at least in part on the Input/Output traffic and the path capacity, wherein the spare Input/Output traffic capacity is based at least in part on a number of a number of Input/Output operations;

determining, by the network interface card, whether to remove the at least one path of the one or more paths between the network interface card and the storage device based at least in part on the spare Input/Output traffic capacity; and in accordance with a determination to remove the path, performing, by the network interface card, the upgrade with the at least one path removed; or in accordance with a determination to not remove the at least one path, performing, by the network interface card, the upgrade with the at least one path included.

2. The method of claim 1, further comprising:

in accordance with performing the upgrade with the at least one path removed, restoring, by the network interface card, the at least one path after concluding the upgrade.

3. The method of claim 1, wherein the monitoring further comprises:

limiting, by the network interface card, the Input/Output traffic on at least one path of the one or more paths to a first threshold.

4. The method of claim 1, wherein the determining further comprises:

delaying, by the network interface card, the upgrade until the Input/Output traffic is below a second threshold.

5. The method of claim 1, wherein the at least one path is restored after the upgrade is completed.

6. The method of claim 1, wherein the monitoring further comprises:

assigning, by the network interface card, a priority to the at least one path of the one or more paths.

7. The method of claim 6, wherein determining whether to remove the at least one path is based at least in part on the priority for the at least one path.

8. A system, comprising:

memory configured to store instructions; and one or more processors configured to execute the instructions to at least:

receive a request to perform an upgrade, the upgrade comprising changes to software of a network interface card;

monitor Input/Output (I/O) traffic on one or more paths between the network interface card and a storage device, each path of the one or more paths having a path capacity comprising a bandwidth of Input/Output traffic;

calculate a spare Input/Output traffic capacity for at least one path of the one or more paths between the network interface card and the storage device based at least in part on the Input/Output traffic and the path capacity, wherein the spare Input/Output traffic capacity is based at least in part on a number of a number of Input/Output operations;

determine whether to remove a path of the one or more paths between the network interface card and the storage device, based at least in part on the spare Input/Output traffic capacity;

in accordance with a determination to remove the at least one path, perform the upgrade with the at least one path removed; and in accordance with a determination to not remove the at least one path, perform the upgrade with the at least one path included.

9. The system of claim 8, further comprising:

in accordance with performing the upgrade with the at least one path removed, restoring the at least one path after concluding the upgrade.

10. The system of claim 8, wherein the monitoring further comprises:

limiting the Input/Output traffic on the at least one path of the one or more paths to a first threshold.

11. The system of claim 8, wherein the determining further comprises:

delaying the upgrade until the Input/Output traffic is below a second threshold.

12. The system of claim 8, wherein the at least one path is restored after the upgrade is completed.

13. The system of claim 8, wherein the monitoring further comprises:

assigning a priority to the at least one path of the one or more paths.

14. The system of claim 13, wherein determining whether to remove the at least one path is based at least in part on the priority for the at least one path.

15. A non-transitory computer-readable medium storing a set of instructions, the set of instructions comprising one or more instructions that, when executed by one or more processors of a device, cause the device to perform operations comprising:

receiving a request to perform an upgrade, the upgrade comprising changes to software of a network interface card;

monitoring Input/Output (I/O) traffic on one or more paths between the network interface card and a storage device, each path of the one or more paths having a path capacity comprising a bandwidth of Input/Output traffic;

calculating a spare Input/Output traffic capacity for at least one path of the one or more paths between the network interface card and the storage device based at least in part on the Input/Output traffic and the path capacity, wherein the spare Input/Output traffic capacity is based at least in part on a number of a number of Input/Output operations;

determining whether to remove the at least one path of the one or more paths between the network interface card and the storage device, based at least in part on the spare Input/Output traffic capacity;

in accordance with a determination to remove the at least one path, performing the upgrade with the at least one path removed; and in accordance with a determination to not remove the at least one path, performing the upgrade with the at least one path included.

16. The non-transitory computer-readable medium of claim 15, further comprising:

in accordance with performing the upgrade with the at least one path of the one or more paths halted, restoring the at least one path after concluding the upgrade.

17. The non-transitory computer-readable medium of claim 15, wherein the monitoring further comprises:

limiting the Input/Output traffic on he at least one path of the one or more paths to a first threshold.

18. The non-transitory computer-readable medium of claim 15, wherein the determining further comprises:

delaying the upgrade until the Input/Output traffic is below a second threshold.

19. The non-transitory computer-readable medium of claim 15, wherein the at least one path is restored after the upgrade is completed.

20. The non-transitory computer-readable medium of claim 15, wherein the monitoring further comprises:

assigning a priority to the at least one path of the one or more paths.

* * * * *